US006961952B1

(12) United States Patent
Takamori et al.

(10) Patent No.: US 6,961,952 B1
(45) Date of Patent: Nov. 1, 2005

(54) DISK CARTRIDGE

(75) Inventors: Nobuyuki Takamori, Kitakatsuragi-gun (JP); Toshiyuki Tanaka, Moriguchi (JP); Mitsunobu Yoshida, Tenri (JP); Nobuyuki Usui, Tenri (JP); Tomoyuki Miyake, Nara (JP); Toshiharu Inui, Yamatokoriyama (JP); Hideharu Tajima, Tenri (JP); Akira Takahashi, Nara (JP); Toshihiro Tamura, Shiki-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/560,234

(22) Filed: Apr. 28, 2000

(30) Foreign Application Priority Data

| Apr. 28, 1999 | (JP) | ............................................ | 11-121102 |
| May 6, 1999 | (JP) | ............................................ | 11-125588 |
| May 7, 1999 | (JP) | ............................................ | 11-126710 |

(51) Int. Cl.⁷ ............................................. G11B 17/04
(52) U.S. Cl. ..................................................... 720/729
(58) Field of Search ............................... 369/291, 77.2, 369/77.1; 360/130, 132, 133

(56) References Cited

U.S. PATENT DOCUMENTS

| 5,091,898 | A | | 2/1992 | Bessho et al. ............. 369/77.2 |
| 5,323,382 | A | * | 6/1994 | Takahashi ................... 369/291 |
| 5,381,402 | A | * | 1/1995 | Lee et al. .................... 369/291 |
| 5,570,342 | A | * | 10/1996 | Kosaka ....................... 369/291 |
| 5,761,015 | A | * | 6/1998 | Oishi .......................... 360/133 |
| 5,777,982 | A | * | 7/1998 | Koshiyouji ................. 369/291 |
| 5,831,967 | A | * | 11/1998 | Otsuka et al. .............. 369/291 |
| 5,894,469 | A | * | 4/1999 | Usami et al. ............... 369/192 |
| 5,901,134 | A | | 5/1999 | Funawatari ................. 369/291 |
| 5,903,542 | A | * | 5/1999 | Sandell et al. ............. 369/291 |
| 6,137,770 | A | * | 10/2000 | Fujisawa .................... 369/291 |
| 6,298,034 | B1 | * | 10/2001 | Hashimoto ................. 369/291 |

FOREIGN PATENT DOCUMENTS

| EP | 0 893 798 A2 | 1/1999 |
| EP | 1 031 982 A2 | 8/2000 |
| JP | 62-117770 | 7/1987 |
| JP | 02-175273 | 7/1990 |
| JP | 03224182 | 3/1991 |
| JP | 04-222830 | 8/1992 |
| JP | 05-054584 | 3/1993 |
| JP | 06-068636 | 11/1994 |
| JP | 07-270743 | 9/1995 |
| JP | 9-231710 | 2/1996 |
| JP | 08-138299 | 5/1996 |
| JP | 08-203129 | 8/1996 |
| JP | 09091914 | 4/1997 |
| JP | 11-120717 | 4/1999 |
| JP | 11-121102 | 4/1999 |
| JP | 11-125588 | 5/1999 |
| JP | 11-126710 | 5/1999 |

OTHER PUBLICATIONS

European Search Report for Application No. EP 00 10 8871 dated Apr. 19, 2002 (6 pp.).

* cited by examiner

*Primary Examiner*—Allen Cao
(74) *Attorney, Agent, or Firm*—Edwards & Angell, LLP; David G. Conlin; George W. Hartnell, III

(57) ABSTRACT

A disk cartridge having a small size and a sufficient portability. The disk cartridge has a size of 58 mm (L1)×54 mm (L2)×4 mm (L3), a thickness less than 5 mm and a small area less than a square of 65 mm. The disk cartridge has a notch 10 formed on the insertion side and having a width of 2 mm (L6) and a length of 27.5 mm (i.e., a taper portion of 6 mm (L4)+a straight portion of 21.5 mm (L5)).

6 Claims, 23 Drawing Sheets

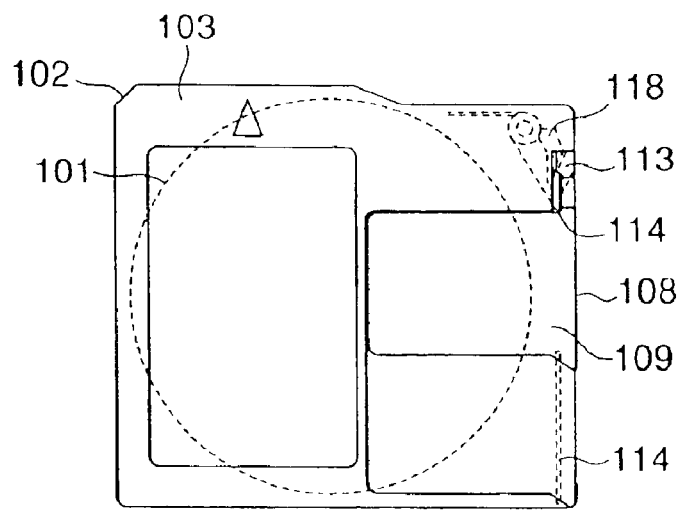
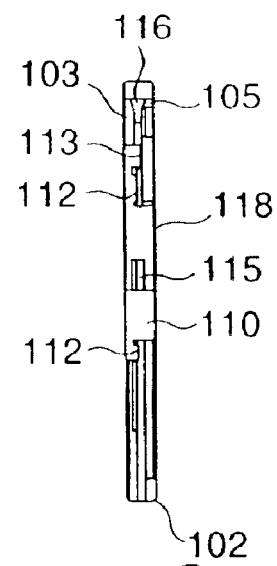
FIG. 8A    FIG. 8B
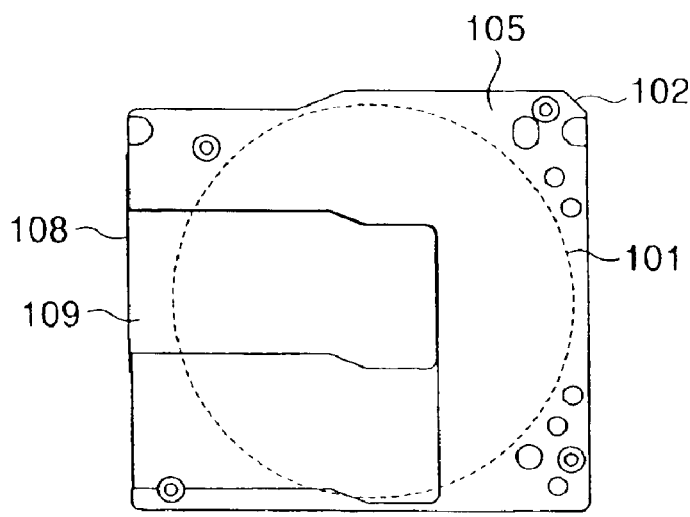
FIG. 8C

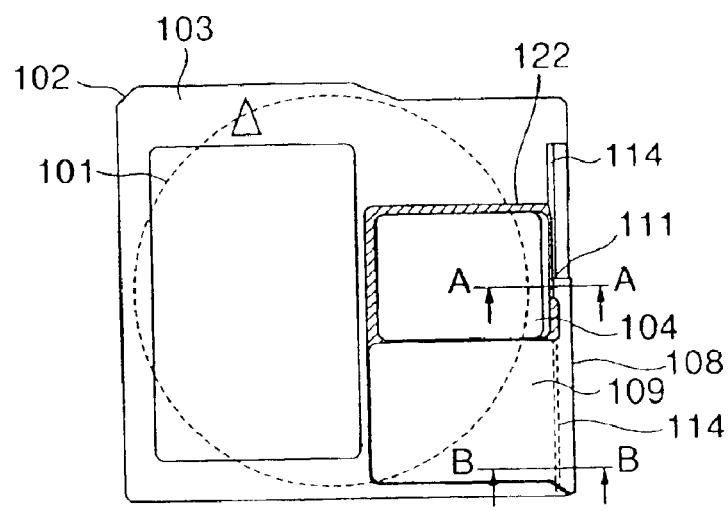
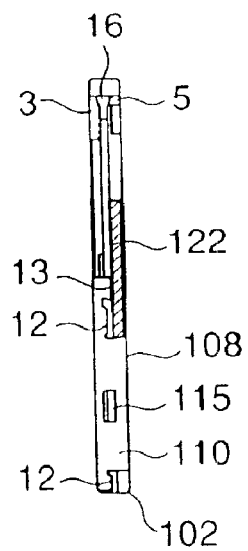
FIG. 9A  FIG. 9B
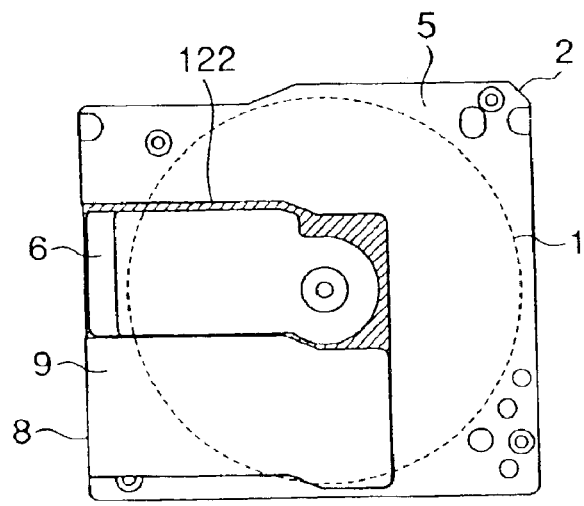
FIG. 9C

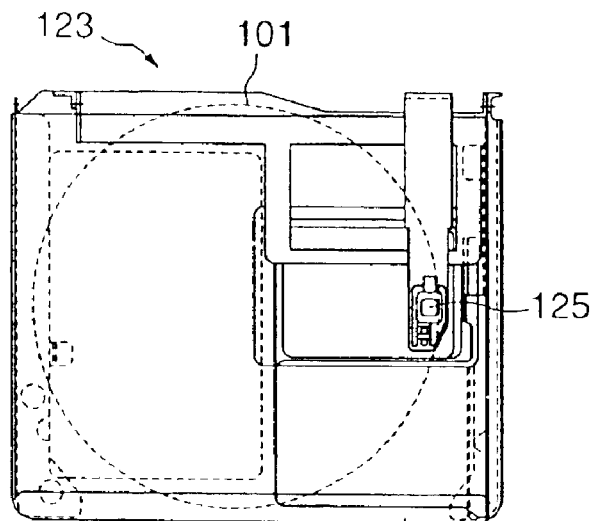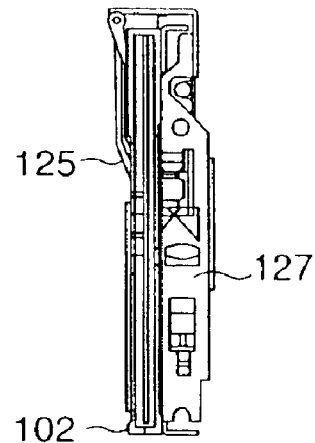
FIG.15A    FIG.15B
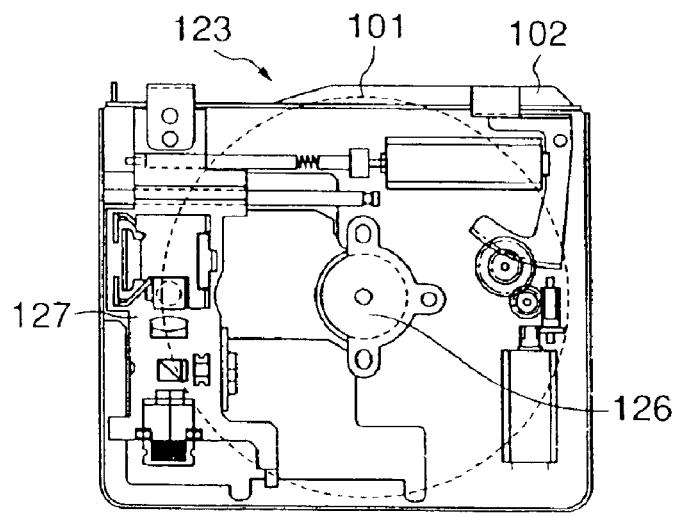
FIG.15C (D)

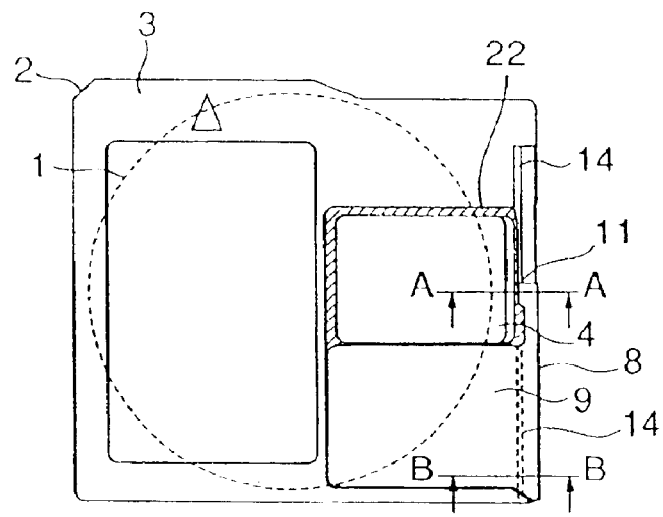
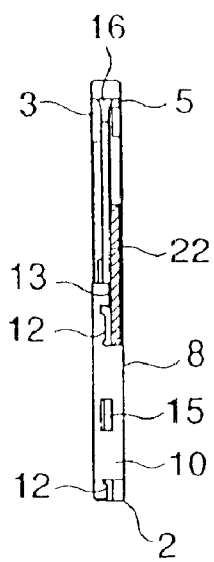
FIG. 20A
FIG. 20B
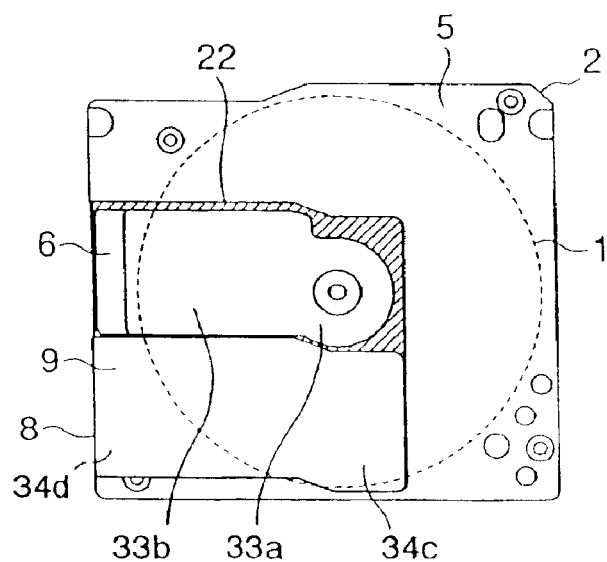
FIG. 20C

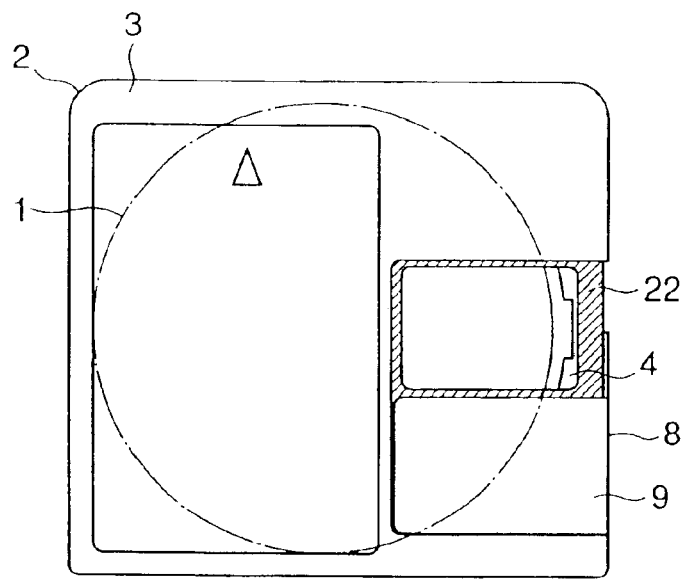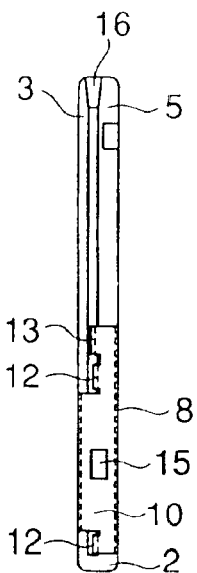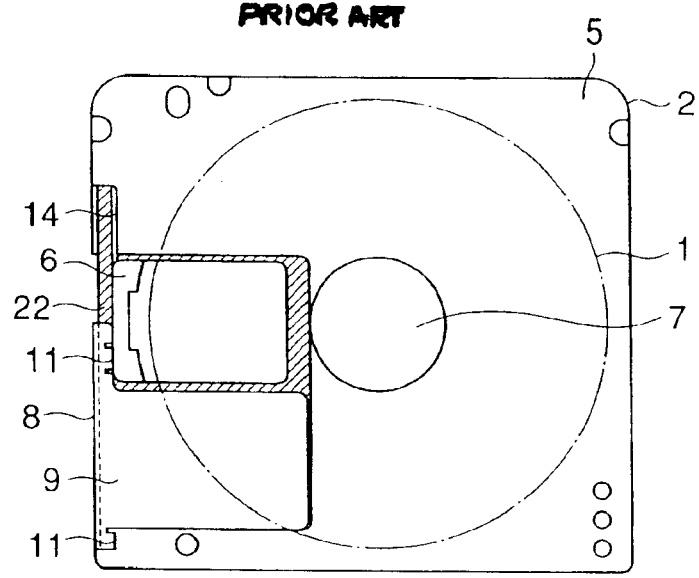
FIG. 30A PRIOR ART
FIG. 30B PRIOR ART
FIG. 30C PRIOR ART

DISK CARTRIDGE

CROSS-REFERENCE TO RELATED APPLICATIONS

This application is related to Japanese patent applications No. HEI 11(1999)-121102 filed on Apr. 28, 1999, No. HEI 11(1999)-125588 filed on May 6, 1999 and No. HEI 11(1999)-126710 filed on May 7, 1999 whose priorities are claimed under 35 USC §119, the disclosure of which is incorporated herein by reference in its entirety.

BACKGROUND OF THE INVENTION

1. Field of the Invention

The present invention relates to a disk cartridge of sufficient portability accommodating an optical disk, especially to a small-sized disk cartridge of an optical disk of a small diameter.

2. Related Art

Optical disks, as used widely in the prior art, are exemplified by CDs (Compact Disks), MDs (Mini Disks) and DVDs (Digital Versatile Disks). These optical disks are divided into a read only type and a recordable type, which is further divided into an additionally recording only type and a recordable type.

The CD is recorded with non-compressed voice data and compressed graphic and voice data. The MD and the DVD are recorded mainly with compressed image data and voice data.

Optical disks such as CDs and DVDs are mostly used for reproduction only and generally reproduce predetermined strings of data as they are. In an additionally recordable CD-R of a recordable type, a special processing is necessary for editing recorded data because recording is impossible, so that the CD-R is used mostly for producing a small number of CDs or for replicating them. A repeatedly recording type is exemplified by a CD-RW, the number of repetitions of which is restricted so that the recorded data are difficult to freely edit.

Both the CD and the DVD have a diameter of 120 mm or 80 mm. Devices for recording images and voices using them as the recording media are larger in size and poorer in portability than devices using magnetic tapes of 4 mm width as the recording media, so that it damages convenience for the user seriously.

On the other hand, the MD is advantageous in its small size (of a diameter of 64 mm) and in its no eventual restriction on the number of repetitions. However, the MD is given a format requiring a constant linear velocity, i.e., relative speed between a recording head and a medium and is changed in its rotating speed depending upon the radial position so that it is not suited for a high-speed access. Since the MD has the same recording density as the CD but has a smaller diameter than the CD, the MD has a smaller storage capacity and it cannot store massive image data continuously.

The optical disk has a quicker access than that of a take-up type storage device such as a tape. Therefore, the optical disk is featured in that it can rearrange the data quickly on demand by the user without reproducing the recorded data sequentially.

However, since the optical disk of the prior art has a large size, the storage device is given, if the disk of the prior art is used, a large size and a poor portability, so that its range of application is restricted.

If the disk diameter is reduced to give priority to the portability, the storage capacity becomes short and the disk cannot record sufficient data.

When there is a restriction on the number of repetitive recordings, the free edition is also restricted, which make it difficult to enhance additional values of data.

On the other hand, a disk cartridge is inserted in a disk driving device (information recording/reproducing device), so that information is recorded on and reproduced from the optical disk accommodated in the disk cartridge through a head supported by an arm of the disk driving device. Accordingly, the size of the disk cartridge affects the size of the disk driving device.

FIG. 27 shows a schematic construction of a disk device in the state where it is loaded with a disk 1 accommodated in a disk cartridge. In FIG. 27, a permanent magnet 4 is fixed on a turntable 3 of a spindle motor 2 at a portion other than a disk bearing face 5 of the turntable 3. On the disk 1, on the other hand, there is fixed a center hub 7 which is made of a magnetic material and has a center hole 6. The center hole 6 is fitted on a spindle 8 of the spindle motor 2, and the permanent magnet 4 of the turntable 3 attracts the center hub 7 so that the disk 1 is pulled onto the disk bearing face 5. As a result, the disk 1 can be portion for shielding the upper and lower openings; a perpendicular portion jointing the upper and lower shutter portions; a pawl for preventing the shutter from coming off; and a guide portion extending from the perpendicular portion for slidably guiding the shutter, and the upper case is sandwiched between the guide portion and the shutter portion.

Here will be described loading actions to the aforementioned state. The disk 1 is held in a cartridge case 9 so that it can rotate in a loaded state without contact with the cartridge case. Here, the cartridge case 9 is held on a cartridge holder 10, which can rotate on a cartridge holder turning axis 11. On the other hand, the cartridge case 9 retains a positional relation to the spindle motor 2 such that a positioning pin 12 managing the positional relation to the spindle motor is fitted in a positioning hole 13 formed in the cartridge case 9 while keeping the rotating disk 1 out of contact with the cartridge case 9.

FIGS. 28A to 28F show actions from the time when the cartridge is inserted into the cartridge holder to the time when the loading is ended, as shown in FIG. 27. For simplicity, the cartridge holder 10 is omitted from FIGS. 28A to 28F. The loading is performed as follows.

In FIG. 28A, the disk 1 is brought into contact with a lower face of a cartridge inner wall in the cartridge case 9 by the gravitation;

In FIG. 28B, the disk 1 contacts with the lower face of the cartridge inner wall, and a spindle 8 of the spindle motor contacts with a center hub 7;

In FIG. 28C, the disk 1 contacts with the upper face of the cartridge inner wall while being prevented from moving downward by the spindle 8;

In FIG. 28D, the cartridge case 9 moves further downward and a positioning hole 13 provided on the cartridge case 9 starts fitting to a cartridge positioning pin 12;

In FIG. 28E, the cartridge case 9 moves further downward, the spindle 8 fits in the center hole 6 and the cartridge positioning pin 12 fits in the cartridge positioning hole 13; and In FIG. 28F, the loading actions are ended.

In the loading actions described above, there may arise a problem that the center hub 7 and the spindle 8 of the motor contact midway of the course from FIGS. 28C to 28E so that the spindle 8 and the center hole 6 fail to fit snugly. This is the problem which occurs when the displacement between the center hole 6 and the spindle 8 increases, and is determined by a free stroke of the disk in the cartridge case, that is, the degree of freedom of the disk, the diameter of the center hole, and the diameter of the spindle, and the positional relation between the spindle and the cartridge case. When the degree of a radial freedom of the disk in the cartridge case is about one half or more of the diameter of the spindle, the spindle may fail to be centered within the center hole 8. For reducing the size of the device, the reduction in the size of the spindle motor is naturally demanded. At this time, the spindle diameter naturally has to be reduced so as to lighten the load on the spindle motor. Therefore the aforementioned trouble becomes liable to occur.

A cartridge 2 of a magneto-optic disk MD of the prior art is shown in FIGS. 29A to 29C, FIGS. 30A to 30C and FIGS. 31A to 31C. FIGS. 29A to 29C are diagrams showing a "closed" state of a shutter; FIGS. 30A to 30C are diagrams showing an "open" state of the shutter; and FIGS. 31A to 31C show a magneto-optic recording/reproducing device which is loaded with the cartridge.

In FIGS. 29A to 29C, FIGS. 30A to 30C and FIGS. 31A to 31C, a cartridge 2 is constructed to include an upper cartridge (case) 3, a lower cartridge (case) 5, a shutter 8 and a lock lever 18. An magneto-optic disk 1 to be recorded with information signals is rotatably accommodated in the cartridge 2. The upper cartridge 3 is provided with: a first opening 4 to be faced by a magnetic head 25 for recording/reproducing the information signals; the lower cartridge 5 is provided with a second opening 6 to be faced by a pickup unit 27 for recording/reproducing the information signals; and a third opening 7 to be faced by a spindle motor 26 for rotating/holding the magneto-optic disk 1. Moreover, the cartridge 2 is inserted into a magneto-optic recording/reproducing device 23, as shown in FIGS. 31A to 31C, to record/reproduce the information.

Here will be described the construction of the shutter 8. This shutter 8 is constructed to include: an upper shutter portion 9 and a lower shutter portion 9 for shutting a first opening and a second opening 4 and 6; a perpendicular portion 10 jointing the upper and lower shutter portions 9; pawls 11 for guiding the shutter to be opened/closed and for preventing the shutter from coming off; a guide portion 12 for preventing the pawls 11 from coming off; and a locked portion 13 to be locked by a lock lever 18.

The pawls 11 are attached to slide in a guide groove 14 formed in the lower cartridge 5 to guide and prevent the shutter 8 from sliding out of the cartridge 2. The shutter 8 in a thickness direction of the cartridge 2 by the internal size of the shutter 8 and the contour of the cartridge 2. Moreover, the pawls 11 are confronted by a guide portion 12 for preventing the pawls 11 from coming off in the thickness direction of the cartridge 2 at the time of closing the shutter 8.

With reference to FIGS. 30A to 30C showing the "open" state of the shutter, will be described the cartridge when the shutter is closed and the shielding state of the shutter. In FIGS. 30A to 30C, the shaded portion represents a part of the cartridge 2 covered with the shutter 8 at the closed state. In both FIGS. 30A and 30C, the cartridge 2 is shielded by moving the shutter along one plane.

Like the magneto-optic disk MD, the floppy disk cartridge of 3.5 inches is shielded by moving the shutter along one plane.

Moreover, the magneto-optic disk cartridge of 3.5 inches has an opening even when the shutter is closed, so that it is not completely shielded.

However, the small and thin type highly dense cartridge and magneto-optic disk device of the prior art are troubled by the following problems.

First of all, the shielding of the opening by the shutter 8 is performed by only one plane of the bottom face of the cartridge 2. The guide groove 14 of the shutter 8 is formed in the bottom face, and the actuator of the pickup unit 27 of the magneto-optic disk cannot come close to the magneto-optic disk 1 especially at an outer circumferential position of the disk so that the device has to be large-sized in its entirety. In other words, a holding spring and a magnetic circuit for the actuator have to be positioned apart from the cartridge 2.

In the magneto-optic disk MD, the guide groove 14 and the third opening 7 faced by the actuator are spatially continuous. As a result, dust may contaminate the inside of the disk even when the shutter 8 is closed. The magneto-optic disk cartridge of 3.5 inches is not shielded completely, neither, so that it has similar troubles.

SUMMARY OF THE INVENTION

The present invention contemplates to solve the above-specified problems and has an object to provide a disk cartridge of sufficient portability accommodating an optical disk.

Another object of the present invention is to provide a disk cartridge allowing reduction in size of the disk driving device.

According to the present invention, there is provided a disk cartridge comprising an optical disk for recording/reproducing information, and a cartridge case rotatably accommodating the optical disk and being provided with a notch on a side face thereof, wherein the notch allows an arm of a disk driving device to approach the optical disk when the disk cartridge is inserted in the disk driving device for recording/reproducing information through a head supported by the arm.

BRIEF DESCRIPTION OF THE DRAWINGS

FIGS. 8A to 8C are views for explaining a shutter opening/closing mechanism of the disk cartridge (with the shutter being closed);

FIGS. 9A to 9C are views for explaining the shutter opening/closing mechanism of the disk cartridge (with the shutter being opened);

FIGS. 15A to 15C are views showing a construction of the magneto-optic recording/reproducing device;

FIGS. 20A, 20B and 20C are a top plan view, a side elevational view and a back view of the present invention, respectively, with its shutter being opened;

FIGS. 30A, 30B and 30C are a top plan view, a side elevational view and a back view showing the example of the prior art, respectively, with its shutter being opened.

DESCRIPTION OF THE PREFERRED EMBODIMENTS

Figure 1A:
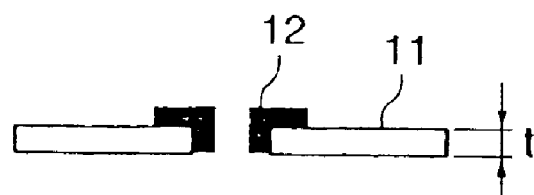
FIGS. 1A, and 1B are schematic diagrams for explaining one embodiment of an optical disk of the present invention.

According to the present invention, there is provided a disk cartridge comprising an optical disk for recording/reproducing information, and a cartridge case rotatably accommodating the optical disk and being provided with a notch on a side face thereof, wherein the notch allows an arm of a disk driving device to approach the optical disk when the disk cartridge is inserted in the disk driving device for recording/reproducing information through a head supported by the arm.

In the disk cartridge according to another aspect of the present invention, the optical disk has preferably a center hub at the center thereof, and the cartridge case has a counterbore formed in a recess form on an inside wall on a side opposite to a side where a drive shaft for rotating the optical disk is inserted, the counterbore facing the center hub.

In the disk cartridge according to further aspect of the present invention, the cartridge case has preferably a thickness less than 5 mm and an area smaller than 65 mm square, and the optical disk has a diameter less than 64 mm and a thickness less than 0.8 mm and forms a track having a pitch less than 0.6 $\mu$m so that the disk can record information of 650 MB or more.

According to another aspect of the present invention, there is provided a disk cartridge comprising:
- an optical disk for recording/reproducing information, and
- a cartridge case rotatably accommodating the optical disk,
- wherein the cartridge case has a recess or protrusion on an inner wall of the cartridge case facing the optical disk and the optical disk is provided with a protrusion or recess corresponding to the recess or protrusion of the cartridge case so that the degree of freedom in a radial direction of the optical disk is defined by the corresponding recess and protrusion.

According to further aspect of the present invention, there is provided a disk cartridge comprising:
- an optical disk for recording/reproducing information, and
- an cartridge case rotatably accommodating the optical disk,
- wherein the cartridge case includes an upper case and a lower case having an upper opening and a lower opening, respectively, for allowing the head for recording/reproducing information to face the optical disk and a shutter for opening and closing the upper and lower openings, the lower case is cut to form the lower opening from a bottom face to a side face, and the shutter shields the upper opening along a plane defined by an upper face of the upper case and shields the lower opening along two planes defined by the bottom face and the side face of the lower case.

According to further aspect of the present invention, there is provided a disk cartridge comprising:
- an optical disk for recording information signals;
- a cartridge case rotatably accommodating the disk and being provided with a first opening and a second opening on upper and lower face thereof, the openings allowing approach of recording and reproducing means for recording or reproducing the information signals on or from the disk; and
- a shutter for opening and closing the openings,
- wherein the first opening formed on one of the upper and lower faces of the cartridge case has a first opening region located in the vicinity of the center of the disk and a second opening region extending from the first opening region in a radial direction of the disk to the outside of the disk,
- an edge of the second opening region on a side in a shutter closing direction in which the shutter closes is formed toward the shutter closing direction as compared with the first opening region and an edge of the second opening region on a side in a shutter opening direction in which the shutter opens is formed toward the shutter closing direction as compared with the first opening region, the shutter has a first shutter section for opening and closing the first opening, the first shutter section has a first shutter region located in the vicinity of the center of the disk and a second shutter region extending from the first shutter region in the radial direction of the disk to the outside of the disk, an edge of the second shutter region on a side in the shutter closing direction is formed toward the shutter closing direction as compared with the first shutter region and an edge of the second shutter region in the shutter opening direction is formed toward the shutter closing direction as compared with the first shutter region.

According to further aspect of the present invention, there is provided a disk cartridge comprising:

an optical disk for recording information signals; and a cartridge case rotatably accommodating the disk, wherein the cartridge case has an opening on one face thereof, the opening having a first opening region located in the vicinity of the enter of the disk and a second opening region extending from the first opening region in a radial direction of the disk to the outside of the disk, the disk cartridge has a shutter for opening and closing the opening, the shutter having a first shutter region located in the vicinity of the center of the disk and a second shutter region extending from the first shutter region in the radial direction of the disk to the outside of the disk, the second opening region is formed toward a direction in which the shutter closes as compared with the first opening region, and the second shutter region is formed toward the direction in which the shutter closes as compared with the first shutter region.

According to further aspect of the present invention, there is provided a disk cartridge comprising:

an optical disk for recording information signals; and a cartridge case rotatably accommodating the disk, wherein the cartridge case has, on one face thereof, a third opening which is located in the vicinity of the center of the disk and allows a spindle motor to approach the disk and a fourth opening which is formed separately from the third opening, extending in a radial direction of the disk to the outside of the disk, and allows a pickup to approach the disk, the disk cartridge has a shutter having a first shutter region for opening and closing the third opening and a second shutter region for opening and closing the fourth opening, the first shutter region and the second shutter region being formed in one piece, the fourth opening is formed toward a direction in which the shutter closes as compared with the third opening, and the second shutter region is formed toward the direction in which the shutter closes as compared with the first shutter region.

[I] A preferred embodiment of the small-sized disk cartridge of the present invention will be described in the sequence of (1) the optical disk of a small diameter, and (2) the cartridge case for accommodating the optical disk of a small diameter.

(1) Optical Disk

The optical disk is formed to have a diameter smaller than 64 mm and a thickness smaller than 0.8 mm so as to improve its portability. The optical disk is desired to have a diameter around 50 mm so that a recording/reproducing device (or an information terminal device) for recording/reproducing the optical disk as a recording medium may be carried in the pocket of a user.

In order to record image information sufficiently, the recording capacity is set to 650 MB (Mega Bytes) or more. Desirably, the recording capacity is about 1.0 GB (Giga Bytes) or more so that image information may be able to be recorded for about 45 minutes or longer (at 3.3 Mbps) in a compressed state.

Figure 1B:
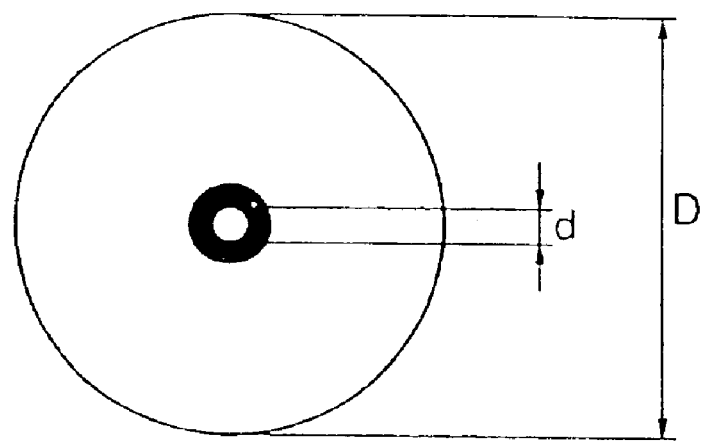
Figure 2:
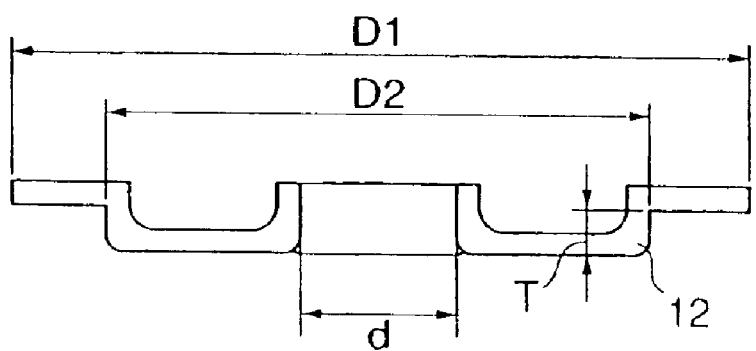
FIG. 2 is an enlarged sectional view showing one embodiment of a center hub of FIG. 1.
Figures 3A, 3C, 3E:
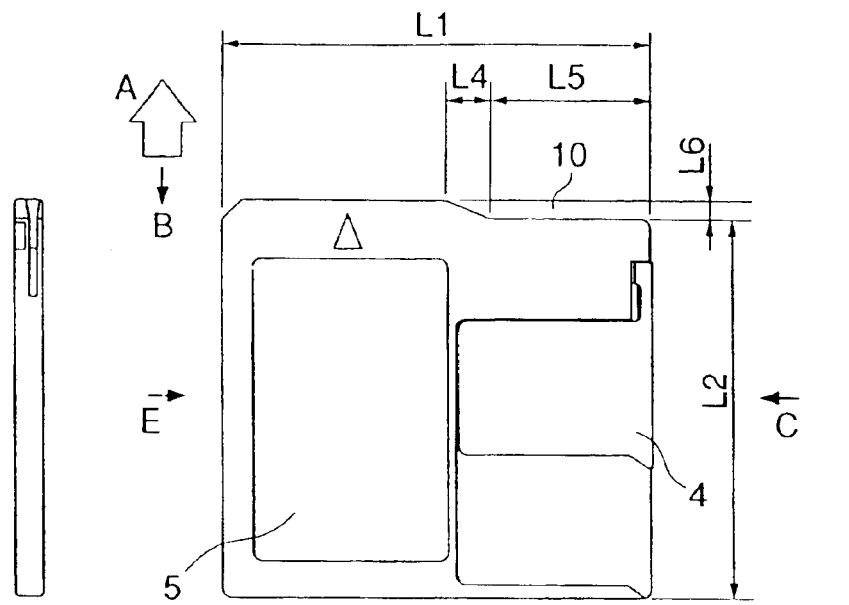
FIGS. 3A to 3E are views for explaining a disk cartridge according to one embodiment of the present invention with its shutter being closed.
Figure 3D:
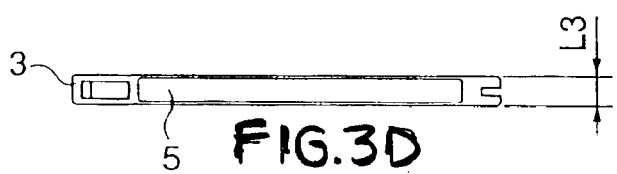
Figure 3B:
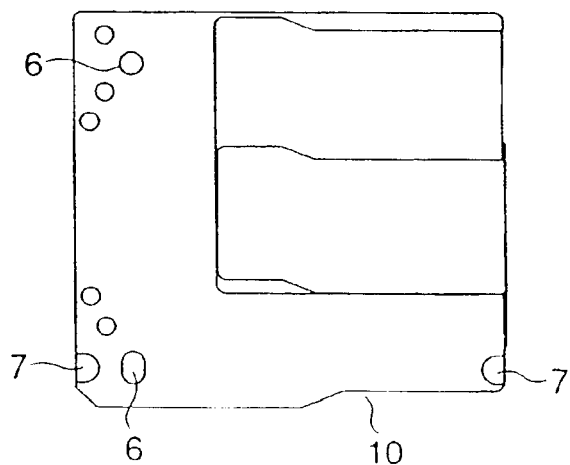
Figures 4A, 4C:
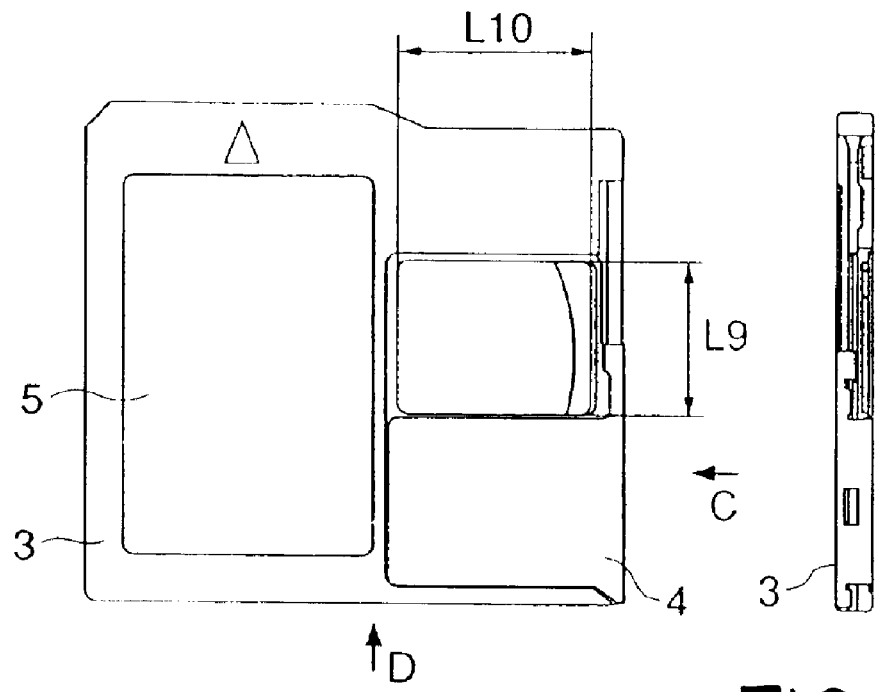
FIGS. 4A to 4D are views for explaining a disk cartridge according to the embodiment of the present invention with its shutter being opened.
Figure 4D:
Figure 4B:
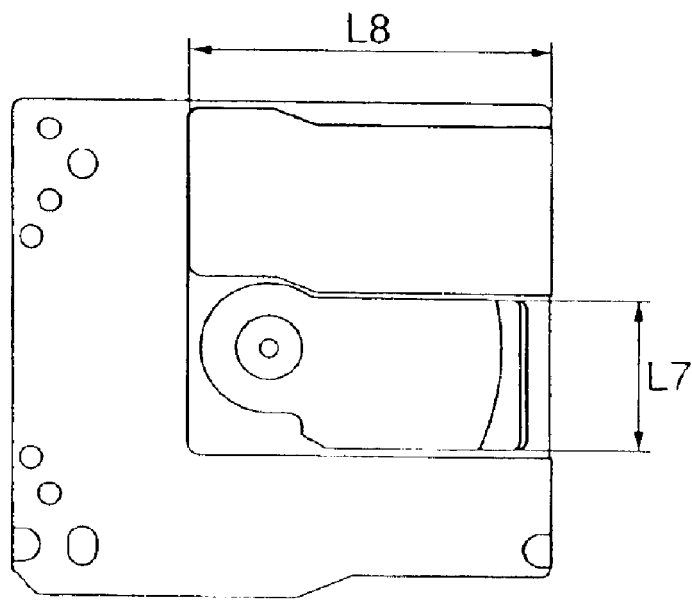

A specific example will be described with reference to FIGS. 1 and 2. An optical disk 11 of this example has a diameter of 50.8 mm and is provided at its center portion with a center hub 12 for a centering purpose. This center hub 12 has a hole of a diameter of 2.6 mm. The center hub 12 is made of a magnetic material so that it can be fixed magnetically on a spindle on the drive side. The optical disk 11 serves for magneto-optically recording/reproducing of data using an optical beam having a wavelength of 650 nm.

The center hub 12 is formed into a brimmed disc shape having an external diameter of 11.0 mm (D1) and an internal diameter of 2.0 mm (d) and is provided with a central protrusion of a diameter of 7 mm (D2) having a stop of 0.5 mm.

The thickness of the optical disk 11 is 0.5 mm. By thus thinning the disk, the occurrence of an aberration can be suppressed while reducing the size.

The optical disk 11 is provided with a groove having a depth of 45±15 nm and a width of 0.52 $\mu$m. With a groove pitch (i.e., the distance between the centers of the grooves) of 1.04 $\mu$m, the optical disk 11 records data in land portions between the grooves, too.

An information recording area ranges within radii of 12.02 to 23.29 mm.

Address information is recorded by meandering one side of groove side walls. In other words, the recording is made by always meandering only one of the two opposed side walls in the address information recording portion.

According to the optical disk thus constructed, it is possible to record data of about 1 GB and to reproduce them in a high quality.

(2) Cartridge Case

The present cartridge case is desired to have a contour of a square smaller than 65 mm and a thickness less than 5 mm so as to improve its portability.

Figure 5:
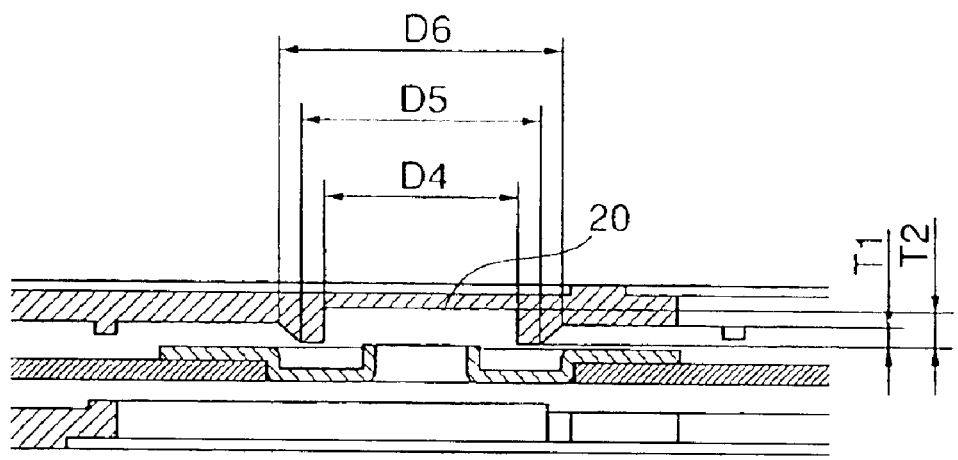
FIG. 5 is a sectional view for the disk cartridge of FIGS. 3 and 4.
Figure 6A:
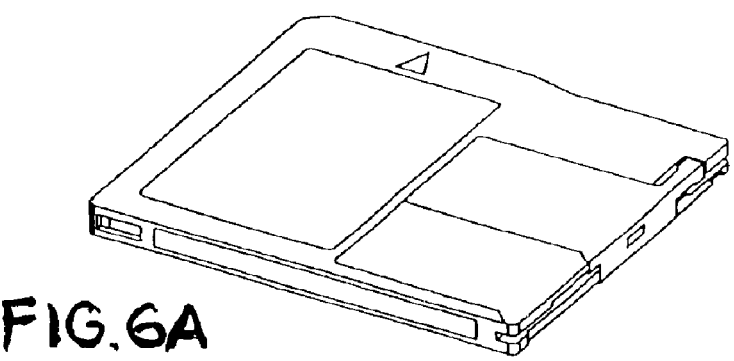
FIGS. 6A and 6B are perspective views of the surface side of the disk cartridge of FIGS. 3 and 4.
Figure 6B:
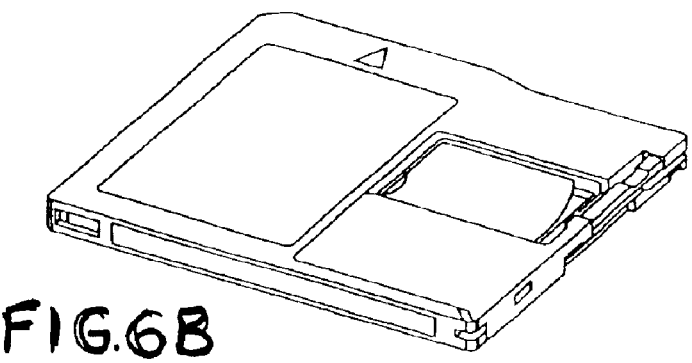
Figure 7A:
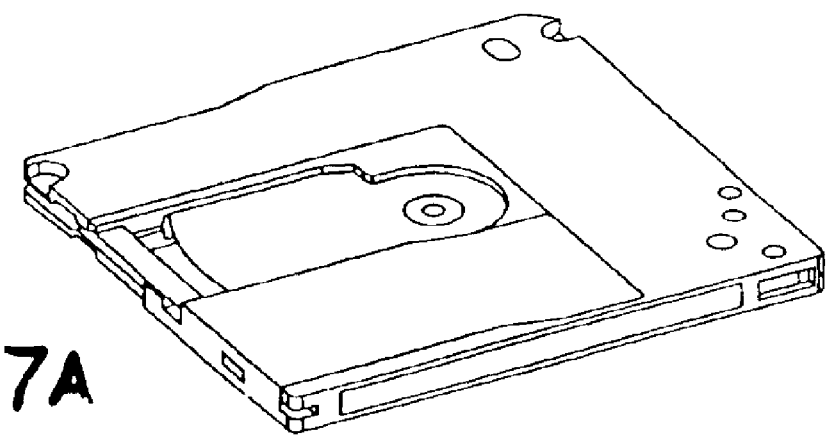
FIGS. 7A and 7B are perspective views of the back side of the disk cartridge of FIGS. 3 and 4.
Figure 7B:
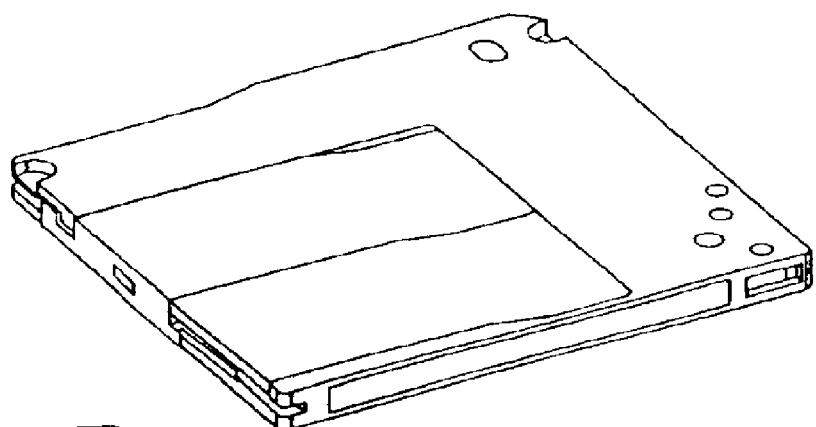

A specific example of the disk cartridge will be described with reference to FIGS. 3 to 7. FIGS. 3A, 3B, 3C, 3D and 3E are a top plan view, a bottom view, a view taken along arrow C, a view taken along arrow D and a view taken along arrow E, respectively, with the cartridge case being closed; FIGS. 4A, 4B, 4C and 4D are a top plan view, a bottom view, a view taken along arrow C and a view taken along arrow D, respectively, with the cartridge case being opened; FIG. 5 is a section of the disk cartridge; FIG. 6 presents perspective views of the disk cartridge (as taken from the side opposed to the incidence of light); and FIG. 7 presents perspective views of the disk cartridge (as taken from the side of the incidence of light).

The disk cartridge of this example has a size of 58 mm (L1)×54 mm (L2) and 4 mm (L3).

The cartridge case is constructed to include a shell 3 for providing a case to protect the disk and a shutter 4 for opening/closing an opening to access to a read/write head and a spindle. The cartridge case is provided with a label applying position 5, cartridge positioning holes 6 and a loading notch 7 on its surface.

On a side (as located in direction A, as shown) of the disk cartridge to be inserted into the recording/reproducing device (or disk driving device), there is formed a notch 10 in a part of the side closer to the shutter. The notch 10 is such that it take no interference with the disk. This notch 10 is formed to have a width of 2 mm (L6) and a length of 27.5 mm (i.e., a taper portion of 6 mm (L4)+a straight portion 1B of 21.5 mm (L5)). As a result, a writing magnetic head arm (i.e., the (root) portion of the arm mounted on the recording/reproducing device) can be arranged closer to the disk (i.e., farther in direction B than the maximum inserted position of the disk in the recording/reproducing device in the direction A). In short, the writing magnetic head arm can be arranged close to the inner side of a square including the disk. This arrangement makes it possible to reduce the size of the recording/reproducing device. Here has been described the case in which the portion of the magnetic head arm mounted to the recording/reproducing device is arranged at the aforementioned notched portion. However, it is naturally arbitrary to arrange a portion of an optical head arm mounted on the recording/reproducing device on the notched portion.

On the other hand, the opening is so enlarged to a width of 16.5 mm (L7)×a length of 40 mm (L8) that the optical pickup may be able to access to the inside of the disk cartridge. The opening for inserting the spindle is given a diameter of 14 mm (D3). On the side of the magnetic head, too, an opening of a width of 16.5 mm (L9)×a length of 22 mm (L10) is formed to avoid as much interference as possible between the head arm and the cartridge wall.

From the view point of the optical pickup, therefore, the opening is made so large that not only the objective lens but also the actuator housing can make an access to the inside of the disk cartridge. In view of the thickness direction of the device, it has been necessary in the prior art to add the thicknesses of the optical pickup and the disk cartridge. By adopting the present disk cartridge, however, the overlap of the thicknesses of the two is enabled to make a high contribution to the thinner construction of the device.

In the section of the disk cartridge of FIG. 5, on the other hand, a taper rib is projected from the inner face of the disk cartridge confronting the leading end of the spindle of the device. The taper rib is shaped to contact or engage with the recess of the center hub. The rib has an internal diameter of φ04.3 mm (D4) and an external diameter of φ6.4 mm (D6) and forms a linearly taper portion from a diameter of φ5.4 mm (D5) to the diameter of φ6.4 mm (D6). The rib has a flat face between the diameters D4 and D5. At this time, the rib is given a height of 0.5 mm (T1) from the cartridge face. In the inner circumference of the rib, moreover, there is formed a counterbore 20 for preventing the leading end of the spindle from contacting with the cartridge face even if the spindle has a considerable length. The height from the crest of the rib to the surface of counterbore is 0.85 mm (T2), and this counterbore has a depth of 0.35 mm (T2–T1) with respect to the inner face of the disk cartridge.

(2)-1

Here will be described in detail one embodiment of a mechanism for opening/closing the shutter of the disk cartridge thus far described.

Figure 10:
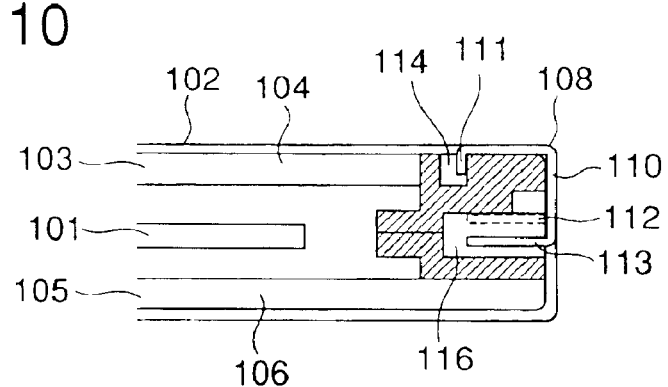
FIG. 10 is a section taken along line A—A of FIG. 9.
Figure 11:
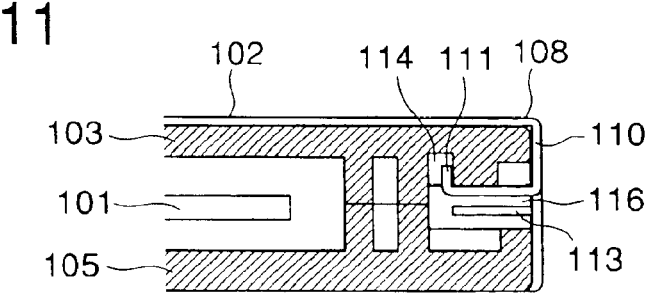
FIG. 11 is a section taken along line B—B of FIG. 9.
Figure 12:
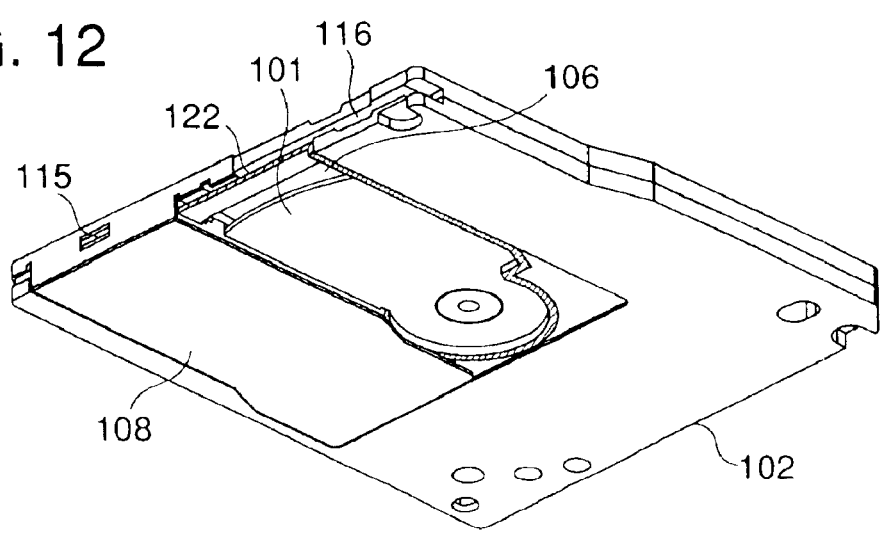
FIG. 12 is a perspective view of the lower face of the disk cartridge (with the shutter being opened)
Figure 13:
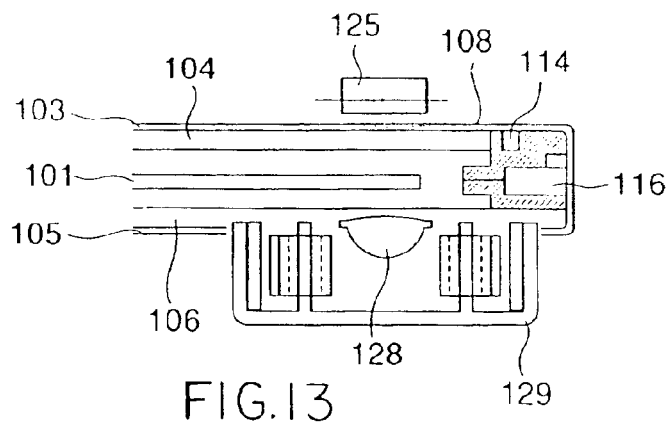
FIG. 13 is a schematic diagram showing an essential portion when the disk cartridge is loaded in a recording/reproducing device.
Figure 14A:
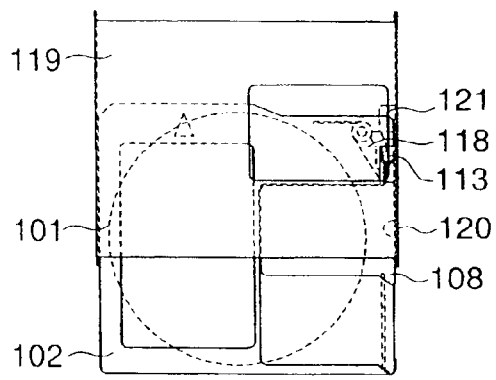
FIGS. 14A to 14C are views for explaining the shutter opening/closing actions when the disk cartridge is inserted.
Figure 14B:
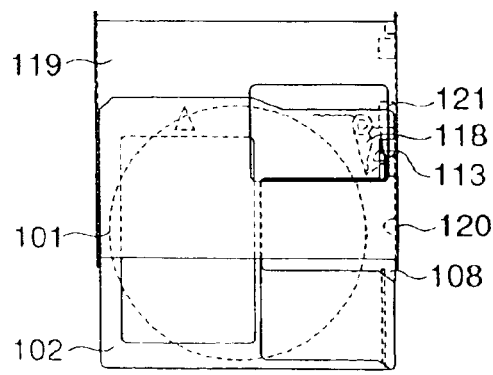
Figure 14C:
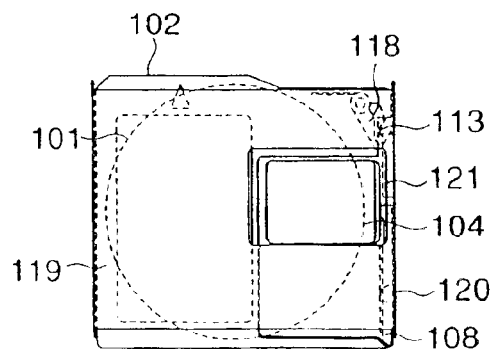

FIG. 8A is a top plan view showing the embodiment of the shutter opening/closing mechanism, FIG. 8B is a side elevation showing the same, and FIG. 8C is a back view showing the same; FIG. 9A is a top plan view showing the embodiment (with the shutter being opened), FIG. 9B is a side elevation showing the same (with the shutter being opened), and FIG. 9C is a back view showing the same (with the shutter being opened); FIG. 10 is a section taken along line A—A of FIG. 9A; FIG. 11 is a section taken along line B—B of FIG. 9A; FIG. 12 is a perspective view (showing the shutter and a shield area of a second opening); FIG. 13 is an arrangement diagram of the second opening and an actuator; FIG. 14A is a diagram for explaining the shutter opening/closing actions (at an initial insertion stage) when the disk cartridge is inserted into a cartridge holder, FIG. 14B is a diagram showing a midway of insertion of the same, and FIG. 14C is a diagram showing the end of insertion of the same; and FIG. 15A is a top plan view showing an magneto-optic recording/reproducing device, FIG. 15B is a side elevation showing the same, and FIG. 15C is a back view showing the same. In FIGS. 8 to 11 and FIGS. 15A to 15C, a cartridge (case) 102 is constructed to include an upper cartridge (case) 103, a lower cartridge (case) 105, a shutter 108 and a lock lever 118. An magneto-optic disk 101 to be recorded with information signals is rotatably accommodated in the cartridge 102. The upper cartridge 103 is provided with: a first opening 104 to be faced by a magnetic head 125 for recording/reproducing the information signals, and a second opening 106 to be faced by a spindle motor 126 for rotating/holding the magneto-optic disk 101 and a pickup unit 127 for recording/reproducing the information signals. Moreover, the cartridge 102 is inserted in its entirety into a magneto-optic recording/reproducing device 123, as shown in FIGS. 15A to 15C, to record/reproduce the information.

Between the upper and lower cartridges 103 and 105 on the sides of the cartridge 102, there is formed a slender space or slot 116 for allowing a release member 121 for releasing the later-described lock lever 118 to pass therethrough.

The shutter 108 is constructed to include: upper and lower shutter portions 109 for shutting the first and second openings 104 and 106; a perpendicular portion 110 jointing the upper and lower shutter portions 109; two pawls 111 for guiding the shutter to be opened/closed and for preventing the shutter from coming out; a guide portion 112 for preventing the pawls 111 from coming out; a locked portion 113 to be locked by the lock lever 118; and a hole portion 115 for an open lever 120 for opening/closing the shutter 108 to go into.

The pawls 111 can slide in guide grooves 114 formed in the upper cartridge 103, to connect with the perpendicular portion 110 thereby to regulate the position of the shutter 108 in a direction perpendicular to the moving direction of the same and to hold and prevent the shutter 108 from coming out. On the other hand, the shutter portions 109 clamp the upper cartridge 103 vertically at the guide portion 112 to hold and prevent the shutter 108 from coming out.

The guide grooves 114 may be formed in either face of the upper cartridge 103. In this embodiment, however, the guide groove 114 on the insertion side is formed over the upper cartridge 103, and the guide groove 114 on the back side is formed in the slot 116, as formed in the side face between the upper and lower cartridges 103 and 104, and on the side of the upper cartridge 103. Thus, the guide grooves 114 are formed in the slot between the upper and lower cartridges so that they cannot be seen from the upper and outer side but can extend the degree of designing freedom.

In the example of the prior art, the second opening 106 of the lower cartridge 105 is shielded by one plane of the bottom face. In this embodiment, as hatched in FIGS. 9A to 9C or FIG. 12, however, a shield area 122 for the shutter 108 is shielded by using two flat faces, i.e., the flat face of the bottom and the flat face of the side so that the opening can be opened from the bottom face to the side face. As a result, an actuator 129 of the pickup unit 127 can be arranged close to the magneto-optic disk 101 even at the outer circumference of the same (as should be referred to FIG. 13), so that the degree of freedom for designing the actuator 129 can be enhanced to provide a smaller-sized magneto-optic disk device.

The actions to open/close the shutter of the disk cartridge of the present invention will be described with reference to FIGS. 14A to 14C. With the shutter 108 being closed, the locked portion 113 of the shutter 108 is locked by the lock lever 118 which is arranged in the upper and lower cartridges 105. The cartridge 102 is inserted into a cartridge holder 119 when it is to be loaded into the device. First of all, the projection of the elastic open lever 120, as attached to the cartridge holder 119 for opening/closing the shutter 108, enters the hole portion 115 formed in the perpendicular portion 110 of the shutter 108. Then, the lock lever 118 is released by the release member 121 belonging to the cartridge holder 119. By the open lever 120, moreover, the shutter 108 is fixed at a predetermined position of the cartridge holder 119. By the subsequent pushing action, the cartridge 102 is inserted deeply. However, the shutter 108 is fixed at that position so that the it is relatively opened/closed. These actions are reversed when the shutter 108 is to be closed.

In the description thus far made, the lower cartridge 105 is positioned on the side of the recording face of the magneto-optic disk 101 whereas the upper cartridge 103 is positioned on the side of the opposite side of the magneto-optic disk 101.

(2)-2

Here will be described in detail the actions of the disk cartridge to be inserted.

FIGS. 16A to 16D are sections showing the entire disk cartridge on the lefthand side and enlarged views showing the central portion of the disk cartridge on the righthand side. From these Figures, the spindle, the cartridge holder, the cartridge positioning pin and so on are omitted for simplifying their illustrations.

Figure 16A:
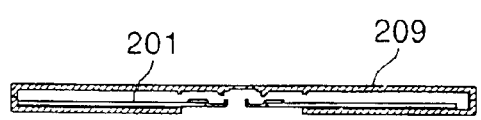
FIGS. 16A to 16D are diagrams for explaining the positional relations between the disk cartridge and a spindle when the disk cartridge is inserted.

FIG. 16A shows the state in which a disk 201 is positioned the closest to the end in the horizontal direction in a cartridge (case) 209 and in which the disk 201 is made to contact with the lower face of the cartridge inner wall in the vertical direction by the gravitation. Here, the disk 201 is provided with a center hub 207 having a center hole 206 at its center portion, and the center hub 207 has a cylindrical recess 214. On the other hand, the cartridge 209 is provided with a ridge 215 on its inner wall on the side opposed to the spindle motor and the disk, and the ridge 215 is partially fitted in the range where the circumferential portion 214a of the recess can exist. The ridge 215 is so shaped that it is diverged the more toward the root. The ridge may be exemplified by one continuous ring or by three or more independent ridges arranged on the circumference. Here, the embodiment has been made with the disk having the center hub but may be exemplified by a disk having an integral structure having not the center hub but a central recess.

Figure 16B:
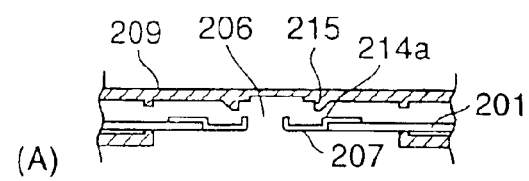
Figure 16B:
Figure 16C:
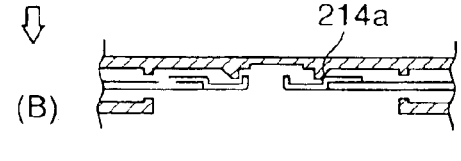
Figure 16C:
Figure 16D:
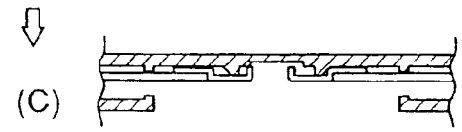
Figure 16D:
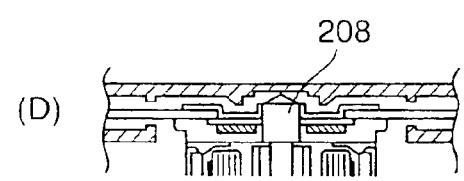

Here will be described the state of FIG. 16B. In this state, the center hub 207 abuts against the spindle so that the disk 201 is raised toward the upper face of the cartridge 209 to hold the circumferential portion 214a of the center hub in contact with the slope of the ridge 215. In the state of FIG. 16C, the disk 201 is raised to move rightward of FIG. 16C along the slope of the ridge 215 so far as it is fitted on a spindle 208. Thus, the disk is fitted on the spindle 208 of the motor so that the motor is loaded with the disk, as shown in FIG. 16D.

Although the present invention has been described by way of example, it is satisfied by such a structure that the disk can be moved to a position where it is fitted and stably mounted on the spindle of the motor.

According to the embodiment of the present invention, as has been described hereinbefore, it is possible to realize a disk cartridge which is small-sized and excellent in the portability.

With this disk cartridge, the head arm can approach closer to the disk in the cartridge plane thereby to reduce the size of the disk driving device.

With this disk cartridge, the spindle is prevented even with a considerable length from contacting at its leading end with the cartridge face, so that it can be elongated without thickening the disk cartridge.

[II]According to the present invention, there is provided a disk cartridge including an optical disk and a cartridge case rotatably accommodating the optical disk, wherein the cartridge case has a recess or a protrusion on an inner wall of the cartridge case facing the optical disk and the optical disk are provided with a protrusion or a recess corresponding to the recess or the protrusion of the cartridge case so that the degree of freedom in a radial direction of the optical disk is defined by the corresponding recess and protrusion.

In the disk cartridge, either of recess or protrusion formed on the cartridge inner wall or the optical disk is preferably tapered at its circumference.

In the disk cartridge, the ridge or protrusion of the optical disk is more preferably formed in the center hub having a center hole to be fitted on the spindle of the spindle motor.

FIGS. 17A to 17D show another embodiment of the present invention. FIGS. 17A to 17D are sections showing the entire disk cartridge on the lefthand side and enlarged views showing the central portion of the disk cartridge on the righthand side. From these Figures, the spindle, the cartridge holder, the cartridge positioning pin and so on are omitted for simplifying their illustrations.

Figure 17A:
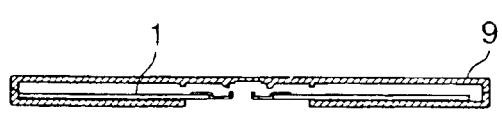
FIGS. 17A to 17D are diagrams showing a cartridge according to another embodiment of the present invention.

FIG. 17A shows the state in which a disk 1 is positioned the closest to the end in the horizontal direction in a cartridge (case) 9 and in which the disk 1 is made to contact with the lower face of the cartridge inner wall in the vertical direction by the gravitation. Here, the disk 1 is provided with a center hub 7 having a center hole 6 at its center portion, and the center hub 7 has a cylindrical recess 14. On the other hand, the cartridge 9 is provided with a ridge 15 on its inner wall on the side opposed to the spindle motor and the disk, and the ridge 15 is partially fitted in the range where the circumferential portion 14a of the recess can exist. The ridge 15 is so shaped that it is diverged the more as it is the closer to the root. The ridge may be exemplified by one continuous ring or by three or more independent ridges arranged on the circumference. Here, the embodiment has been made with the disk having the center hub but may be exemplified by a disk having an integral structure having not the center hub but a central recess.

Figure 17B:
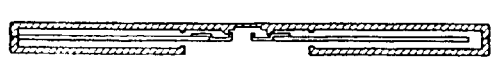
Figure 17C:
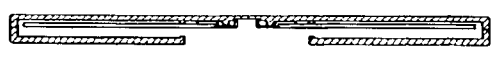
Figure 17D:
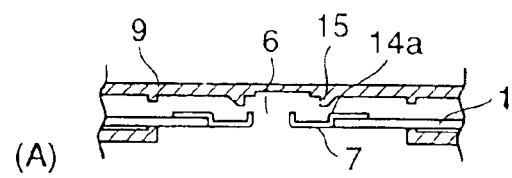
Figure 17D:
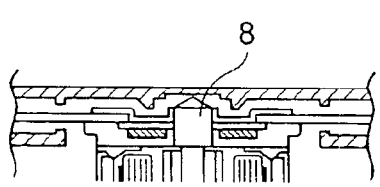

Here will be described the state of FIG. 17B. FIGS. 18A to 18D shows the state, in which the center hub 7 abuts against the spindle so that the disk 1 is raised toward the upper face of the cartridge 9 to hold the circumferential portion 14a of the center hub in contact with the slope of the ridge 15. In the state of FIG. 17C, the disk 1 is raised to move rightward of FIG. 17C along the slope of the ridge 15 so far as it is fitted on a spindle 8. Thus, the disk is fitted on the spindle 8 of the motor so that the motor is loaded with the disk, as shown in FIG. 17D.

In the embodiment, as shown in FIGS. 17A to 17D, the disk 1 is positioned the closest to the end in the horizontal direction in the cartridge 9 to provide a ridge on its inner wall, and the ridge 15 is so shaped that it is diverged the more as it is the closer to the root. The disk is thus given a structure in which the recess is formed in the portion other than its recording/reproducing portion.

Figure 18A:
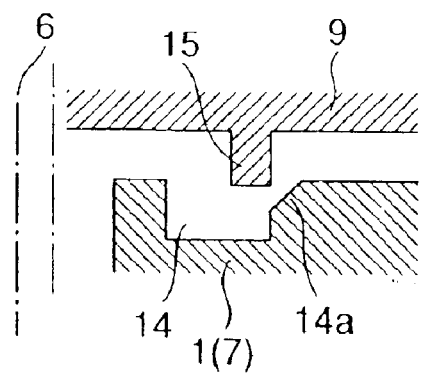
FIGS. 18A to 18D are diagrams showing a modification of the present invention.

A modification of the structure of the aforementioned embodiment is shown in FIGS. 18A to 18D. In this modified structure, as shown in FIG. 18A, the ridge is formed on the cartridge inner wall whereas the recess is formed in the disk as in the embodiment, but the recess in the disk is tapered to have a slope diverging to the outer circumference. With this structure, too, the disk can be moved to a position where the disk is fitted on the spindle of the motor, thereby to realize a more reliable loading without any mistake.

Figure 18B:
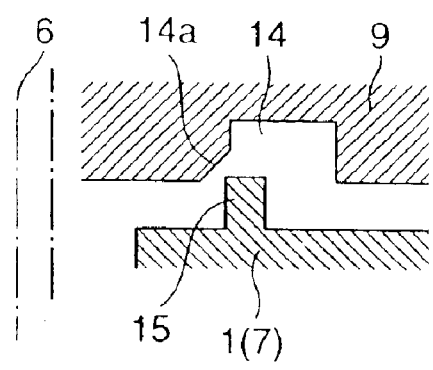

In FIG. 18B, on the other hand, the relation between the ridge on the cartridge inner wall and the recess of the disk is reversed from that of FIG. 18A. This construction can also secure effects similar to those of the aforementioned structure.

Figure 18C:
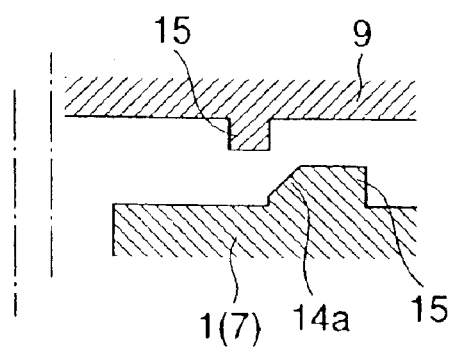
Figure 18D:
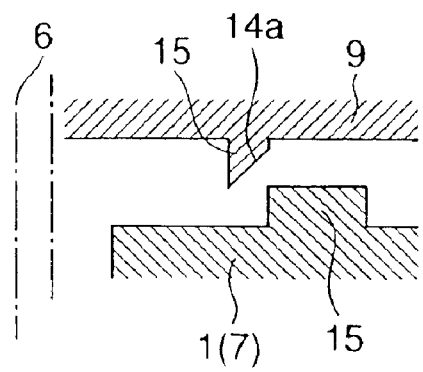

In FIGS. 18C and 18D, moreover, the ridge is formed on both the cartridge inner wall and the disk, and a slope is formed on either of the ridges. This construction can naturally secure effects similar to those of the aforementioned structure.

Although the present invention has been described by way of example, it is satisfied by such a structure that the disk can be moved to a position where it is fitted and stably mounted on the spindle of the motor. This structure should not restrict the present invention.

For the disk loading, according to the embodiment of the present invention, the degree of radial freedom of the disk is regulated by forming the recess or ridge on the cartridge inner wall confronting the disk and the spindle motor for rotating the disk and by forming the cylindrical ridge or recess on the disk while making a pair with the recess or ridge on the inner wall. As a result, the disk can be moved to a position necessary for the disk to be fitted on the spindle of the motor, thereby to realize the more reliable loading without any mistake.

When the spindle is thin, moreover, the range of its position necessary for the disk to fit thereon is narrowed. According to the present invention, however, the spindle diameter can be reduced to reduce the size of the motor and accordingly the entire device.

[III] According to the present invention, there is provided a disk cartridge preferably comprising: an optical disk for recording/reproducing information and a cartridge case rotatably accommodating the optical disk, wherein the cartridge case includes an upper case and a lower case having an upper opening and a lower opening, respectively, for allowing the head for recording/reproducing information to face the optical disk and a shutter for opening and closing the upper and lower openings, the lower case is cut to form the lower opening from a bottom face to a side face, and the shutter shields the upper opening along a plane defined by an upper face of the upper case and shields the lower opening along two planes defined by the bottom face and the side face of the lower case.

In the disk cartridge of the present invention, on the other hand, the shutter preferably may include: an upper and a lower shutter portion for shielding the upper and lower openings; a perpendicular portion jointing the upper and lower shutter portions; a pawl for preventing the shutter from coming off; and a guide portion extending from the perpendicular portion for slidably guiding the shutter, and the upper case is sandwiched between the guide portion and the shutter portion.

In the disk cartridge of the present invention, alternatively, the upper cartridge case may have a guide groove for slidably guiding the shutter.

Further, the shutter may be provided with a pawl and the cartridge case may be provided with a guide groove, for allowing sliding movements and preventing the shutter from coming off at the time of opening and closing the shutter, in an upper case side of an elongated space formed between the upper and lower cases.

In the disk cartridge of the present invention comprising: a disk cartridge according to claim 10, wherein the lower case is positioned on a side of a recording face of the optical disk, and the shutter includes an upper shutter portion and a lower shutter portion for shielding the upper and lower openings of the upper and lower cases, respectively, and a guide portion for guiding the movement of the shutter, so that the upper case is sandwiched between the upper shutter portion and the guide portion.

In the disk cartridge of the present invention, moreover, the shutter preferably include a pawl for preventing the shutter from coming off, and the position of the shutter may be restricted in a direction perpendicular to its moving direction between the pawl and the perpendicular portion jointing the upper shutter portion and the lower shutter portion.

Figure 19A:
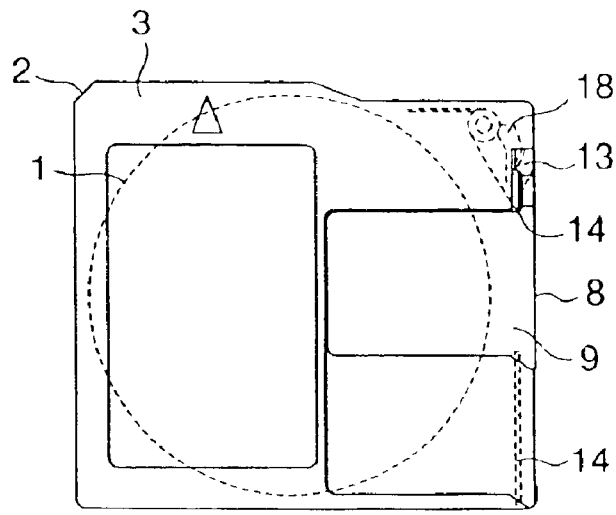
FIGS. 19A, 19B and 19C are a top plan view, a side elevational view and a back view showing still another embodiment of the present invention, respectively.
Figure 19B:
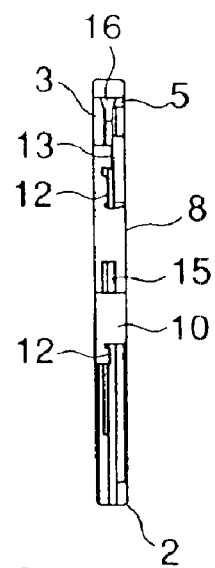
Figure 19C:
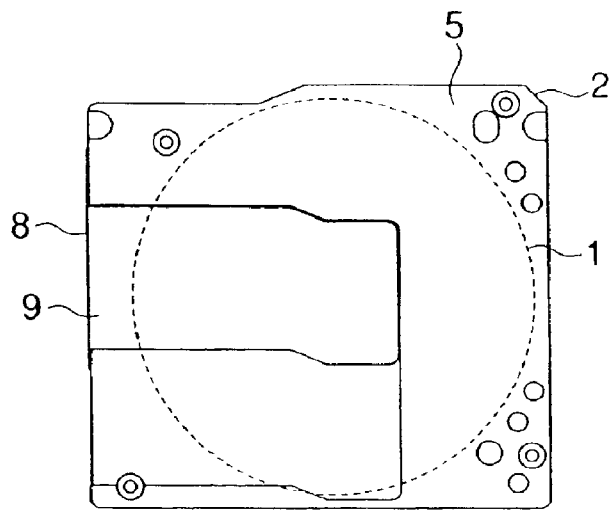
Figure 21:
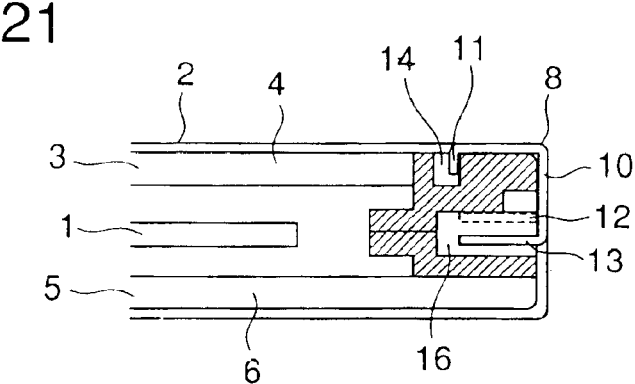
FIG. 21 is a section taken along line A—A of FIG. 20A.
Figure 22:
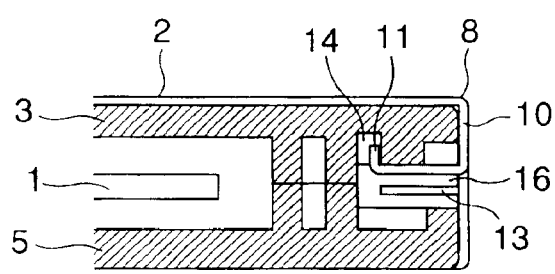
FIG. 22 is a section taken along line B—B of FIG. 20A.
Figure 23:
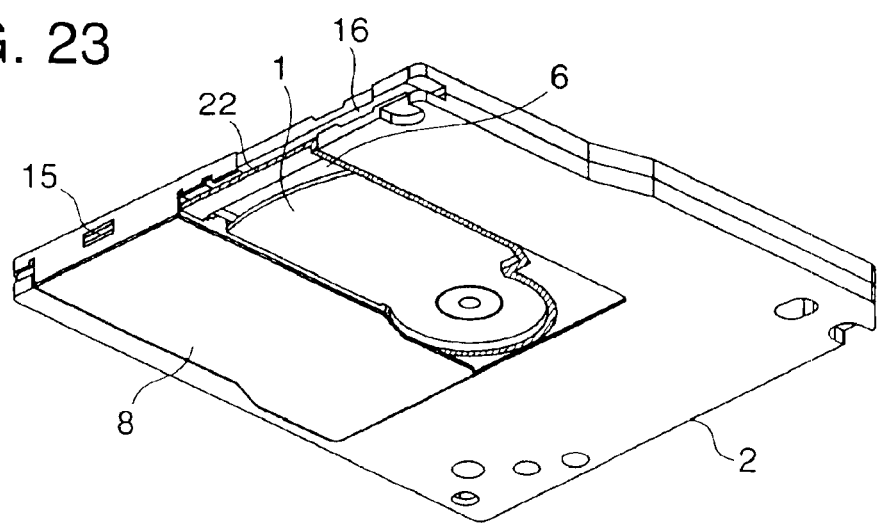
FIG. 23 is a perspective view showing the embodiment of the present invention (i.e., a shield area for a shutter and a second opening)
Figure 24:
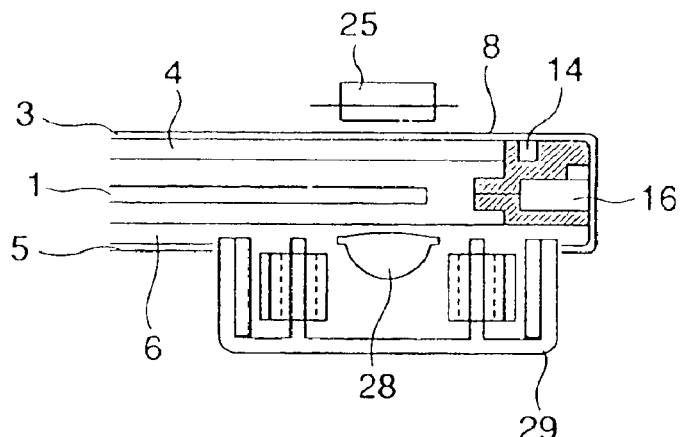
FIG. 24 is a diagram showing an arrangement of the second opening, an actuator and a magnetic head.
Figure 25A:
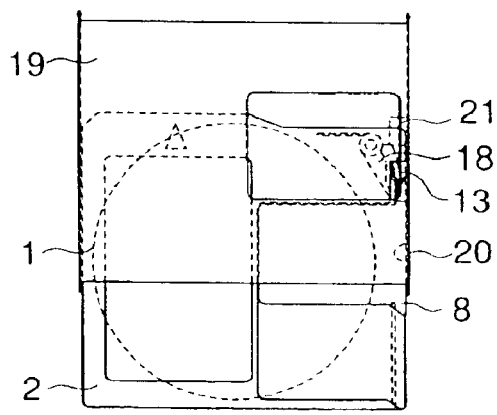
FIGS. 25A, 25B and 25C are diagrams showing the shutter opening/closing actions at an initial time of inserting a cartridge into a cartridge holder, a midway of the insertion, and an end of the insertion, respectively.
Figure 25B:
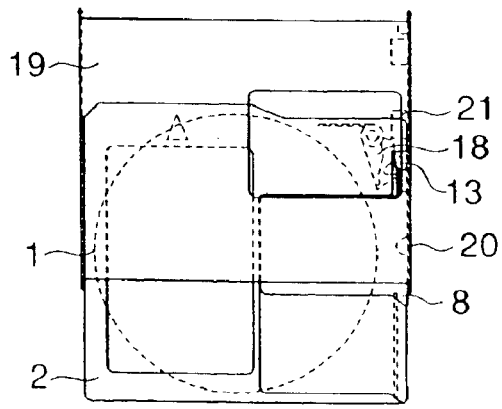
Figure 25C:
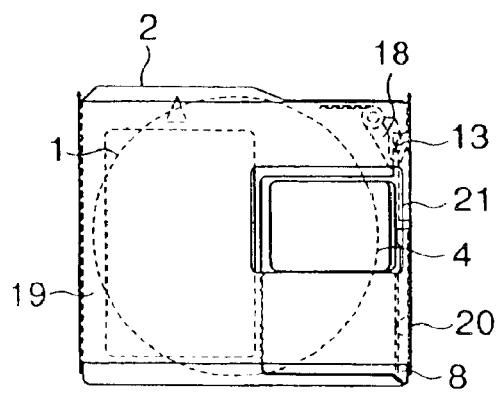
Figure 26A:
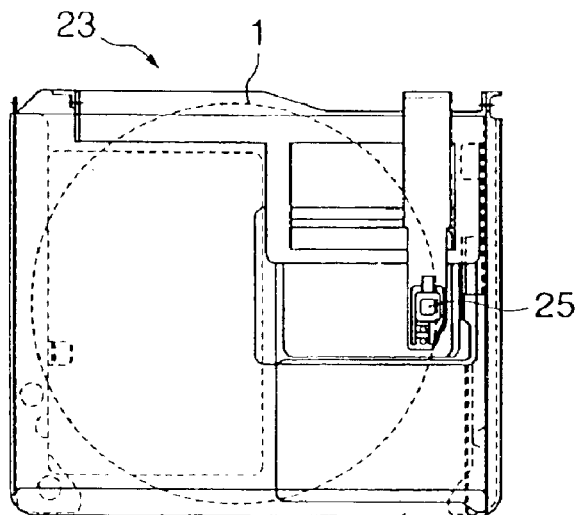
FIGS. 26A, 26B and 26C are a top plan view, a side elevational view and a back view of a magneto-optic recording/reproducing device, respectively.
Figure 26B:
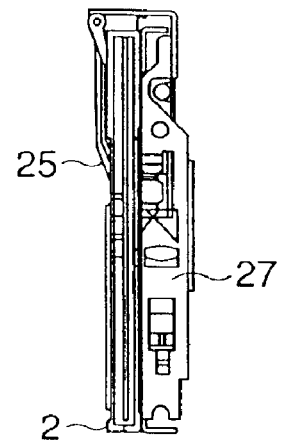
Figure 26C:
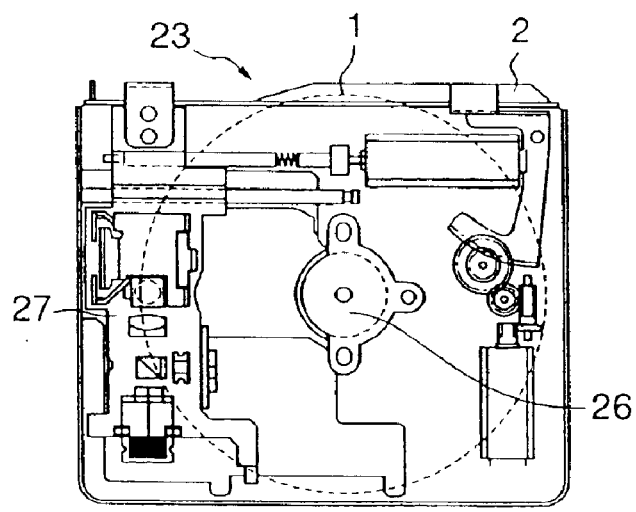
Figure 27:
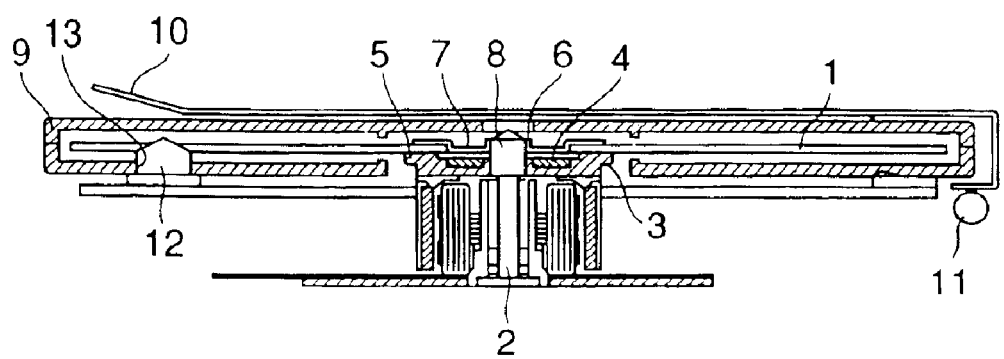
FIG. 27 is a diagram showing a schematic construction of a disk device being loaded with a disk.
Figure 28A:
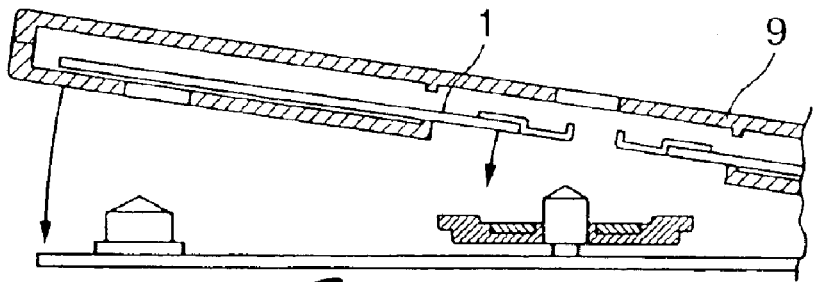
FIGS. 28A to 28F are diagrams for explaining the operations from the loading start to the loading end.
Figure 28B:
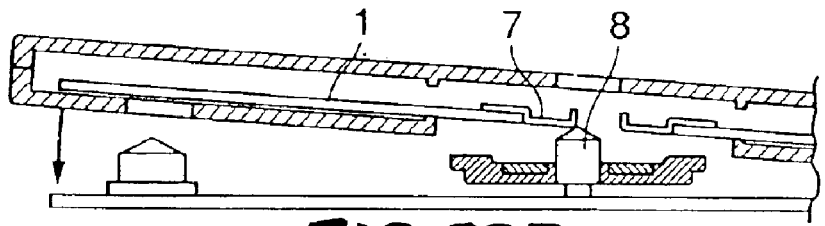
Figure 28C:
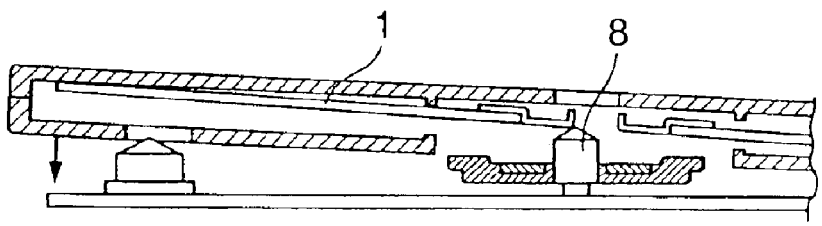
Figure 28D:
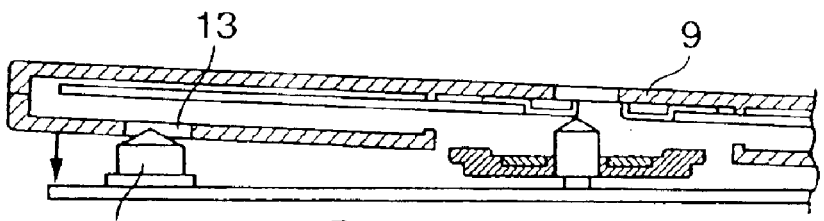
Figure 28E:
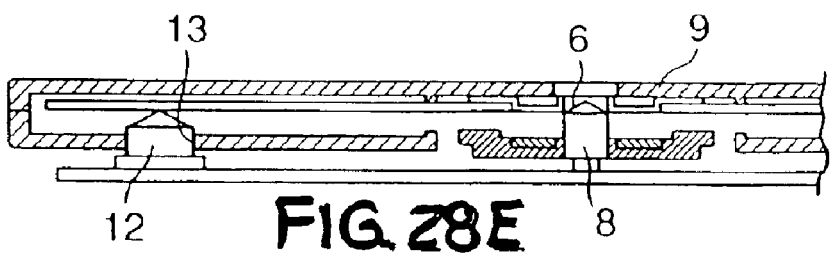
Figure 28F:
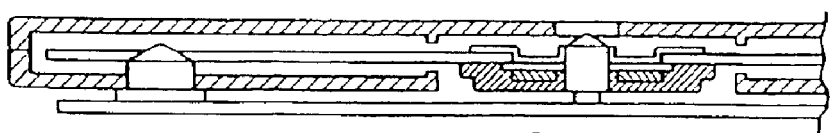
Figure 29A:
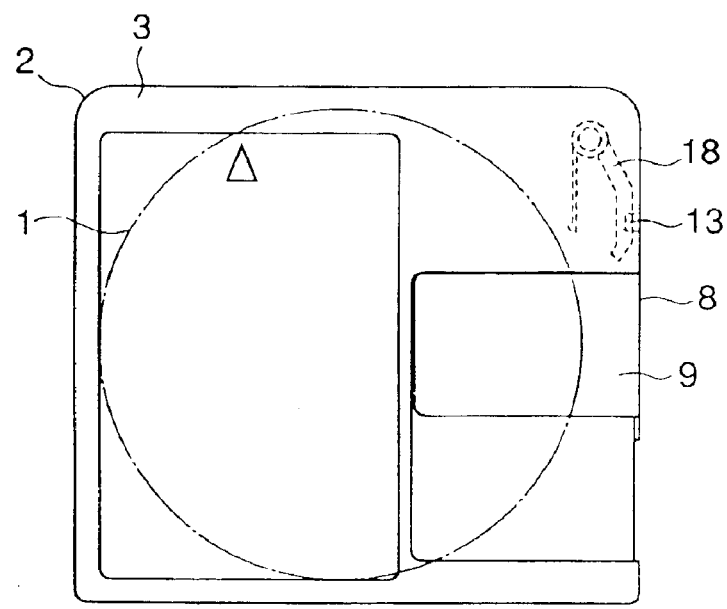
FIGS. 29A, 29B and 29C are a top plan view, a side elevational view and a back view showing an example of the prior art, respectively.
Figure 29B:
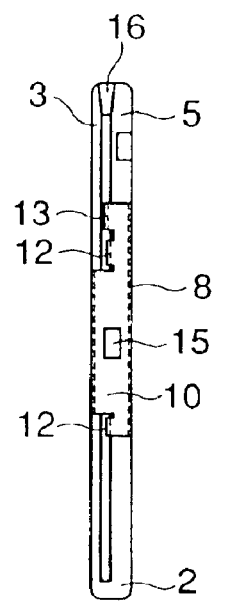
Figure 29C:
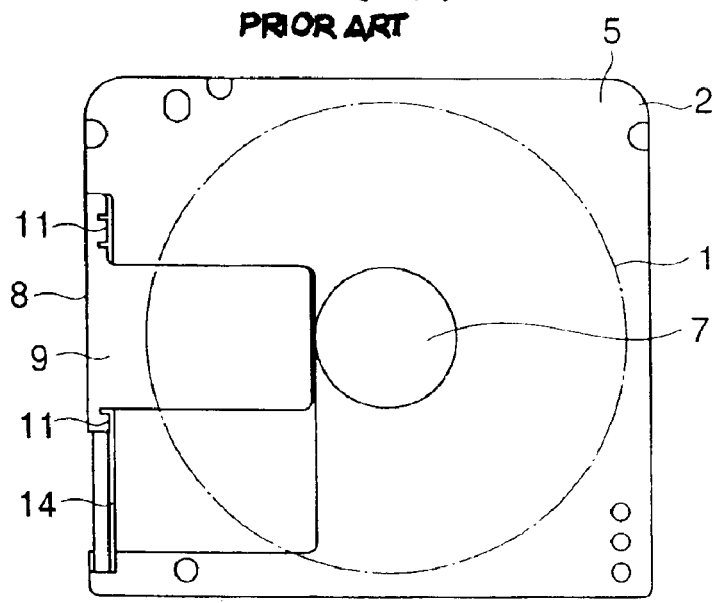
Figure 31A:
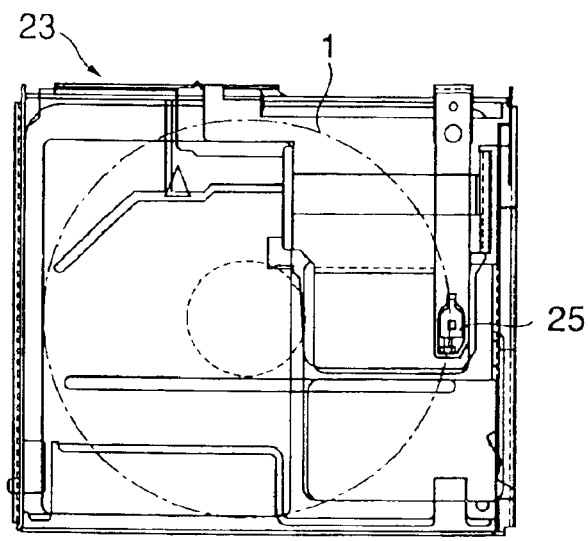
FIGS. 31A, 31B and 31C are a top plan view, a side elevational view and a back view showing an example of a magneto-optic recording/reproducing device of the prior art, respectively.
Figure 31B:
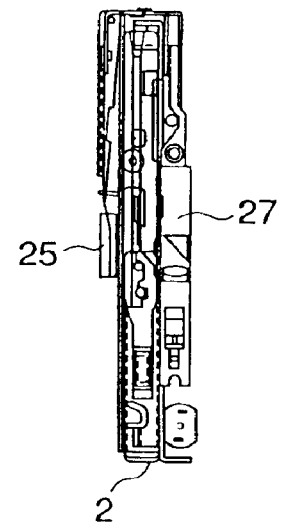
Figure 31C:
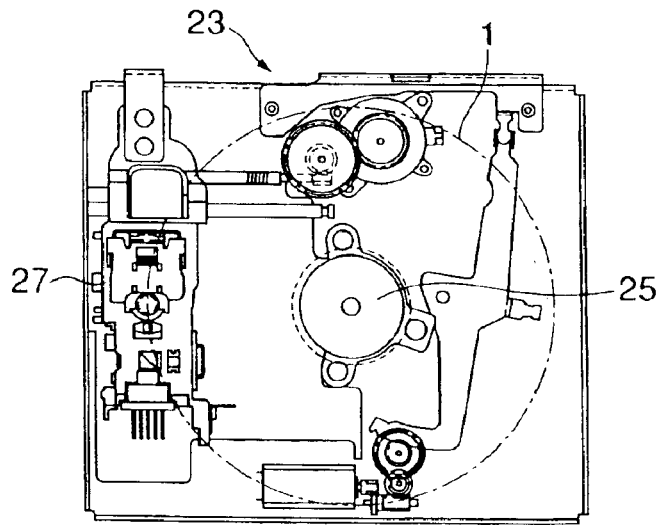

FIG. 19A is a top plan view showing still another embodiment of the present invention, FIG. 19B is a side elevation showing the same, and FIG. 19C is a back view showing the same; FIG. 20A is a top plan view showing the embodiment (with its shutter being opened), FIG. 20B is a side elevation showing the same (with its shutter being opened), and FIG. 20C is a back view showing the same (with its shutter being opened); FIG. 21 is a section taken along line A—A of FIG. 20A; FIG. 22 is a section taken along line B—B of FIG. 20A; FIG. 23 is a perspective view showing the embodiment of the present invention (showing the shutter and a shield area of a second opening); FIG. 24 is an arrangement diagram of the second opening and an actuator; FIG. 25A is a diagram for explaining the shutter opening/closing actions (at an initial insertion stage) when the disk cartridge is inserted into a cartridge holder, FIG. 25B is a diagram showing a midway of insertion of the same, and FIG. 25C is a diagram showing the end of insertion of the same; and FIG. 26A is a top plan view showing an magneto-optic recording/reproducing device, FIG. 26B is a side elevation showing the same, and FIG. 26C is a back view showing the same. In this embodiment, the same portions as those of FIGS. 29A to 29C, FIGS. 30A to 30C and FIGS. 31A to 31C are designated by the common reference numerals.

In FIGS. 19 to 22 and FIGS. 26A to 26C, a cartridge (case) 2 is constructed to include an upper cartridge 3, a lower cartridge 5, a shutter 8 and a lock lever 18. An magneto-optic disk 1 to be recorded with information signals is rotatably accommodated in the cartridge 2. The upper cartridge 3 is provided with: a first opening 4 to be faced by a magnetic head 25 for recording/reproducing the information signals; and the lower cartridge 5 is provided with a second opening 6 to be faced by a spindle motor 26 for rotating/holding the magneto-optic disk 1 and a pickup unit 27 for recording/reproducing the information signals. Moreover, the cartridge 2 is inserted in its entirety into a magneto-optic recording/reproducing device 23, as shown in FIGS. 26A to 26C, to record/reproduce the information.

Between the upper and lower cartridges 3 and 5 on the sides of the cartridge 2, there is formed a slender space or slot 16 for allowing a release member 21 for releasing the later-described lock lever 18 to pass therethrough.

The shutter 8 is constructed to include: upper and lower shutter portions 9 for shutting the first and second openings 4 and 6; a perpendicular portion 10 jointing the upper and lower shutter portions 9; two pawls 11 for guiding the shutter to be opened/closed and for preventing the shutter from coming out; a guide portion 12 for preventing the pawls 11 from coming out; a locked portion 13 to be locked by the lock lever 18; and a hole portion 15 for an open lever 20 for opening/closing the shutter 8 to go into.

The pawls 11 can slide in guide grooves 14 formed in the upper cartridge 3, to coact with the joint portion 10 thereby to regulate the position of the shutter 8 in a direction perpendicular to the moving direction of the same and to hold and prevent the shutter 8 from coming out. On the other hand, the shutter portions 9 clamp the upper cartridge 3 vertically at the guide portion 12 to hold and prevent the shutter 8 from coming out.

The guide grooves 14 may be formed in either face of the upper cartridge 3. In this embodiment, however, the guide groove 14 on the insertion side is formed over the upper cartridge 3, and the guide groove 14 on the back side is formed in the slot 16, as formed in the side face between the upper and lower cartridges 3 and 4, and on the side of the upper cartridge 3. Thus, the guide grooves 14 are formed in the slot between the upper and lower cartridges so that they cannot be seen from the upper and outer side but can extend the degree of designing freedom.

In the example of the prior art, as hatched in FIGS. 30A to 30C, the second opening 6 of the lower cartridge 5 is shielded by one plane of the bottom face. In this embodiment, as hatched in FIGS. 20A to 20C or FIG. 23, however, a shield area 22 for the shutter 8 is shielded by using two flat faces, i.e., the flat face of the bottom and the flat face of the side so that the opening can be opened from the bottom face to the side face. As a result, an actuator 29 of the pickup unit 27 can be arranged close to the magneto-optic disk 1 even at the outer circumference of the same (as should be referred to FIG. 24), so that the degree of freedom for designing the actuator 29 can be enhanced to provide a smaller-sized magneto-optic disk device.

With reference to FIG. 24, here will be described the reason why the entire size of the device can be made smaller by notching the second opening 6 throughout its side face to form the guide groove 14 in the upper cartridge 3. In the magneto-optic disk device, the magnetic head 25 facing the first opening is smaller than the actuator 29 facing the second opening so that the actuator 29 and the cartridge 2 interfere with each other when the size of the entire device is to be reduced. This entire size can be made smaller by forming the guide groove in the upper cartridge 3.

The actions to open/close the shutter of the cartridge of the present invention will be described with reference to FIGS. 25A to 25C. With the shutter 8 being closed, the locked portion 13 of the shutter 8 is locked by the lock lever 18 which is arranged in the upper and lower cartridges 5. The cartridge 2 is inserted into a cartridge holder 19 when it is to be loaded into the device. First of all, the projection of the elastic open lever 20, as attached to the cartridge holder 19 for opening/closing the shutter 8, enters the hole portion 15 formed in the perpendicular portion 10 of the shutter 8. Then, the lock lever 18 is released by the release member 21 belonging to the cartridge holder 19. By the open lever 20, moreover, the shutter 8 is fixed at a predetermined position of the cartridge holder 19. By the subsequent pushing action, the cartridge 2 is inserted deeply. However, the shutter 8 is fixed at that position so that the it is relatively opened/closed. These actions are reversed when the shutter 8 is to be closed.

In the description thus far made, the lower cartridge 5 is positioned on the side of the recording face of the magneto-optic disk 1 whereas the upper cartridge 3 is positioned on the side of the opposite side of the magneto-optic disk 1.

Referring to FIG. 20, an opening 6 provided in a lower shell (cartridge case) 5 is an opening crossing a magneto-optical disk 1 in a radial direction of the disk substantially from the center of a cartridge 2. The opening 6 allows a pickup unit (not shown) to approach the disk 1 and, substantially at the center disk 1, allows a spindle motor to approach the disk 1.

The opening 6 is comprised of a region A 33a substantially at the center of the cartridge 2 and a region B 33b connected to the region A 33a and extending therefrom in the radial direction of the disk to the outside of the disk. As understood from FIG. 20, the region B 33b is asymmetric in the direction of movement of a shutter 8 as seen from the center of the disk (or the region A 33a) and is formed toward a closing direction of the shutter 8 (a direction in which the shutter 8 moves to close the opening 6). In the example of FIG. 20, an edge of the region B 33b of the opening 6 on a closing direction side is located toward the closing direction side as compared with the region A 33a, and an edge of the region B 33b on an opening direction (a direction in which the shutter 8 moves to open the opening 6) side is located toward the closing direction side as compared with the region A 33a.

The shutter 8 over the opening 6 is comprised of a region C 34c substantially at the center of the cartridge 2 and a region D 34d connected to the region C 34c and extending therefrom in the radial direction of the disk to the outside of the disk. As understood from FIG. 20, the region D 34d is asymmetric in the direction of movement of the shutter 8 as seen from the region C 34c and is formed toward the closing direction of the shutter 8 as compared with the region C 34c. In the example of FIGS. 19 and 20, an edge of the shutter 8 in the region D 33d on the closing direction side is located toward the closing direction side as compared with the region C 34c, and an edge of the shutter 8 in the region D 34d on the opening direction side is located toward the closing direction side as compared with the region C 34c.

The outline of an edge of the shutter 8 on the closing direction side is substantially the same as the outline of an edge of the opening 6 on the shutter opening direction side, at least in a side where the region D 34d is formed rather than the center of the disk in a direction perpendicular to the moving direction of the shutter.

In the present invention, with the above-detailed construction, the region B 33b in the opening 33 can be larger than in the case where the opening 6 and the shutter 8 are provided substantially at the midway of the cartridge 2 in the opening/closing direction of the shutter 8. Accordingly, an increased number of components of the pickup unit can be inserted within the opening 6. Thus the size of the recording and reproducing device can be reduced.

Also, an actuator (not shown) for an object lens of the pickup unit can be placed adjacently to the object lens, which produces the effect of suppressing the vibration of the object lens. Further, the components of the pickup unit can be arranged asymmetrically to the object lens, which improves the degree of freedom in design.

The outline of the edge of the shutter 8 on the closing direction side is substantially the same as that of the edge of the opening 6 on the shutter opening direction side. Therefore, a smaller stroke of the shutter 8 than in conventional cartridges is required for opening the shutter 8 so that the shutter does not overlap the opening.

According to the embodiment of the present invention thus far described, the design is made to position the actuator of the pickup unit closer to the magneto-optic disk by shielding the second opening of the shutter with the two plane faces of the flat face of the bottom and the plat face of the side and by notching the second opening from the bottom face to the side face. As a result, it is possible to design an actuator of high performance having a high degree of design and to thin the device as a whole. Since a complete shield is performed when the shutter is closed, on the other hand, there is obtained an effect that the disk cartridge inside can be kept away from waste or dust.

In addition to the effect, on the other hand, the shutter is vertically held by the upper shutter portion, the pawls and the guide portion so that the accuracy can be determined by the size of the shutter and the thickness of the upper cartridge thereby to provide another effect that the sizing accuracy can be advantageously managed. Still another effect is that even if the second opening of the lower cartridge is cut away from the bottom face to the side face the shutter can be prevented from dropping into the second opening.

In addition to the aforementioned effects, moreover, the guide groove is formed in the upper cartridge so that the second opening can be elongated without cutting the guide groove midway when it is notched from the bottom face to the side face.

In addition to the foregoing effects, still moreover, the guide grooves 114 are formed in the slot between the upper and lower cartridges so that they cannot be seen from the upper and outer side but can extend the degree of designing freedom.

Since the lower opening can be made large, moreover, it is possible to make a design that the actuator of the pickup unit can be positioned close to the magneto-optic disk.

What is claimed is:

1. A disk cartridge comprising:

an optical disk for recording/reproducing information, and a cartridge case rotatable accommodating the optical disk, wherein the cartridge case includes a front portion, a rear portion, and two side portions, wherein each of the two side portions is disposed substantially parallel to a direction of insertion of the disk cartridge into a disk driving device and said front portion is provided with a notched area, wherein the notched area allows an arm mounted on the disk driving device to approach the optical disk from said notched area and to move within the notched area substantially perpendicular to the direction of insertion when the disk cartridge is inserted in the disk driving device for recording/reproducing information through a head supported by the arm, wherein the optical disk has a center hub at the center thereof, and the cartridge case has a counterbore formed in a recess form on an inside wall on a side opposite to a side where a drive shaft for rotating the optical disk is inserted, the counterbore facing the center hub.

2. A disk cartridge comprising:

an optical disk for recording/reproducing information, and a cartridge case rotatable accommodating the optical disk, wherein the cartridge case includes an upper case and a lower case having an upper opening and a lower opening, respectively, for allowing the head for recording/reproducing information to face the optical disk and a shutter for opening and closing the upper and lower openings, the lower case is cut to form the lower opening from a bottom face to a side face, and the shutter shields the upper opening along a plane defined by an upper face of the upper case and shields the lower opening along two planes defined by the bottom face and the side face of the lower case, wherein the shutter includes an upper shutter portion and a lower shutter portion for shielding the upper and lower openings, a perpendicular portion jointing the upper and lower shutter portions, a pawl for preventing the shutter from coming off and a guide portion extending from the perpendicular portion for slidably guiding the shutter, and the upper case is sandwiched between the guide portion and the upper shutter portion.

3. A disk cartridge according to claim 2, wherein the upper case has a guide groove for slidably guiding the shutter.

4. A disk cartridge according to claim 3, wherein the shutter is provided with a pawl and the cartridge case is provided with a guide groove, for allowing sliding movements and preventing the shutter from coming off at the time of opening and closing the shutter, in an upper case side of an elongated space formed between the upper and lower cases.

5. A disk cartridge according to claim 4, wherein the lower case is positioned on a side of a recording face of the optical disk, and the shutter includes an upper shutter portion and a lower shutter portion for shielding the upper and lower openings of the upper and lower cases, respectively, and a guide portion for guiding the movement of the shutter, so that the upper case is sandwiched between the upper shutter portion and the guide portion.

6. A disk cartridge according to claim 5, wherein the shutter includes a pawl for preventing the shutter from coming off and the position of the shutter is restricted in a direction perpendicular to a moving direction of the shutter by the pawl and a perpendicular portion jointing the upper shutter portion and the lower shutter portion.

* * * * *